(12) United States Patent
Otsuki et al.

(10) Patent No.: US 7,560,595 B2
(45) Date of Patent: Jul. 14, 2009

(54) NON-AQUEOUS ELECTROLYTE CELL, ELECTROLYTE STABILIZING AGENT, AND PHOSPHAZENE DERIVATIVE AND METHOD FOR PREPARATION THEREOF

(75) Inventors: Masashi Otsuki, Musashimurayama (JP); Shigeki Endo, Tokorozawa (JP); Takao Ogino, Tokorozawa (JP); Yasuo Horikawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 643 days.

(21) Appl. No.: 10/482,810

(22) PCT Filed: Jun. 28, 2002

(86) PCT No.: PCT/JP02/06571

§ 371 (c)(1),
(2), (4) Date: Jan. 5, 2004

(87) PCT Pub. No.: WO03/005479

PCT Pub. Date: Jan. 16, 2003

(65) Prior Publication Data

US 2004/0191635 A1    Sep. 30, 2004

(30) Foreign Application Priority Data

| Jul. 5, 2001 | (JP) | ............... 2001-204415 |
| Jul. 9, 2001 | (JP) | ............... 2001-207705 |
| Jul. 9, 2001 | (JP) | ............... 2001-207706 |
| Aug. 9, 2001 | (JP) | ............... 2001-242051 |
| Aug. 9, 2001 | (JP) | ............... 2001-242067 |

(51) Int. Cl.
  *H01M 10/40* (2006.01)
  *C07F 9/6581* (2006.01)

(52) U.S. Cl. .................. 568/9; 568/10; 568/12

(58) Field of Classification Search ............ None
See application file for complete search history.

(56) References Cited

U.S. PATENT DOCUMENTS 5,830,600 A * 11/1998 Narang et al. .......... 429/326

FOREIGN PATENT DOCUMENTS

| EP | 0 294 495 A1 | 12/1988 |
| JP | 06-013108 A | 1/1994 |
| JP | 11-191431 A | 7/1999 |
| JP | 2000-030740 A | 1/2000 |
| JP | 2001-023687 A | 1/2001 |
| JP | 2001-23687 A | 1/2001 |
| JP | 2001-102088 A | 4/2001 |
| JP | 2001-217001 A | 8/2001 |
| JP | 2001-338682 A | 12/2001 |
| JP | 2002-075444 A | 3/2002 |
| WO | WO 97/44842 A1 | 11/1997 |
| WO | WO 00/33410 A1 | 6/2000 |
| WO | WO 01/09973 A1 | 2/2001 |
| WO | WO 01/39314 A1 | 5/2001 |
| WO | WO 01/86746 A1 | 11/2001 |
| WO | WO 02/21630 A1 | 3/2002 |

OTHER PUBLICATIONS

Allen et al. Inorganic chemistry 1985, 24(11), 1653-1656.*

* cited by examiner

*Primary Examiner*—Daniel M Sullivan
*Assistant Examiner*—Yevegeny Valenrod
(74) *Attorney, Agent, or Firm*—Sughrue Mion, PLLC

(57) ABSTRACT

A non-aqueous electrolyte cell comprises a positive electrode, a negative electrode and a non-aqueous electrolyte containing a support salt. The non-aqueous electrolyte further comprises a phosphazene derivative. The phosphazene derivative having a specified structure functions as an electrode stabilizing agent or a non-combustion agent.

6 Claims, 15 Drawing Sheets

Example 7 : GC-MS chromatogram

MS spectrum of E0/F = 2/4

MS spectrum of EO/F = 3/3

Example 9 : GC-MS chromatogram

MS spectrum of EO/F = 4/2

NON-AQUEOUS ELECTROLYTE CELL, ELECTROLYTE STABILIZING AGENT, AND PHOSPHAZENE DERIVATIVE AND METHOD FOR PREPARATION THEREOF

TECHNICAL FIELD

This invention relates to a non-aqueous electrolyte cell capable of preferably utilizing in various fields requiring safety, miniaturization and weight reduction without a risk of explosion and an electrode stabilizing agent suitable for use in the non-aqueous electrolyte cell and having an excellent electrode stability and developing excellent cell characteristics over a long period of time as well as a novel phosphazene derivative suitable for use in various applications and a method of producing the same.

BACKGROUND ART

Heretofore, nickel-cadmium batteries were particularly the main current as a secondary cell for backing up memories in AV-information equipments such as personal computers, VTR and the like or a power source for driving them. Recently, non-aqueous electrolyte secondary cells are considerably noticed instead of the nickel-cadmium battery because they are high in the voltage and have a high energy density and develop an excellent self-discharge characteristic, and hence various developments are attempted and a part thereof is commercialized. For example, a greater number of note-type personal computers, mobile phones and so on are driven by such a non-aqueous electrolyte secondary cell.

In the non-aqueous electrolyte secondary cell, since carbon is frequently used as a material forming a negative electrode, various organic solvents are used as an electrolyte for the purpose of reducing a risk when lithium is formed on the surface and rendering a driving voltage into a higher level. Also, an alkali metal or the like (particularly, lithium metal or lithium alloy) is used as a negative electrode in the non-aqueous electrolyte secondary cell for a camera, an aprotic organic solvent such as ester type organic solvent or the like is usually used as an electrolyte.

However, the non-aqueous electrolyte secondary cells have the following problems as to the safety though the performance is high. Firstly, when the alkali metal (particularly lithium metal, lithium alloy or the like) is used as the negative electrode in the non-aqueous electrolyte secondary cell, since the alkali metal is very high in the activity to water content, there is a problem that if water is penetrated into the cell due to incomplete sealing thereof or the like, risks of generating hydrogen by reacting the material of the negative electrode with water, ignition and the like become high. Also, since the lithium metal is low in the melting point (about 170° C.), there is a problem that if a large current violently flows in short-circuiting or the like, there is caused a very risky state that the cell abnormally generates heat to cause the fusion of the cell or the like. Further, there is a problem that the electrolyte based on the above organic solvent is vaporized or decomposed accompanied with the heat generation of the cell to generate a gas or the explosion-ignition of the cell are caused by the generated gas.

In order to solve the above problems, there is proposed a technique that a cylindrical battery is provided with such a mechanism that when a temperature rises in the short-circuiting and overcharging of the cylindrical battery to increase a pressure inside the battery, a safety valve is actuated and at the same time a terminal of the electrode is broken to control the flowing of excess current of not less than a given quantity into the battery (Nikkan Kogyo Shinbun-sha, "Electron Technology", 1997, vol. 39, No. 9). However, it is not reliable that the above mechanism is always and normally operated. If the mechanism is not normally operated, there is remained a problem that the heat generation due to the excess current becomes large to fear a risky state of ignition or the like.

Furthermore, the conventional non-aqueous electrolyte secondary cell has a problem in view of long-running stability of the cell and the like that when an ester-based electrolyte or the like is used as a non-aqueous electrolyte, a lithium ion source or the like such as $LiPF_6$ or the like as a support salt is decomposed into $LiF$ and $PF_5$ with the lapse of time to generate $PF_5$ gas or the generated $PF_5$ gas is further reacted with water or the like to generate hydrogen fluoride gas, and the corrosion of the electrode and the like by these gases proceeds or the electrode and the electrolyte are reacted accompanied with the discharge-recharge cycling of the cell to decompose the electrolyte.

Moreover, a lithium secondary cell conducting the discharge-recharge cycle by oxidation-reduction of lithium metal has hitherto been utilized as a non-aqueous electrolyte cell having high output and energy density. In such a lithium secondary cell, when lithium metal is used as an active substance for negative electrode, a highest theoretical capacity is obtained, so that various studies are actively conducted in various fields requiring miniaturization and weight reduction of the cell.

In the secondary cell containing the lithium metal as an active substance for negative electrode, however, there is a problem that lithium dissolved as an ion in the electrolyte during the discharge is partly precipitated as a dendrite (dendrite crystal) in the recharge to bring about internal short-circuiting. In order to solve this problem, a technique of rendering lithium into LiAl alloy or wood alloy to weaken the activity of lithium is conducted, but this technique has a problem that sufficient performances as the secondary cell are hardly developed. And also, there is a technique of using a carbonaceous material such as graphite or the like as a material for negative electrode, which has a problem that the theoretical capacity density in the negative electrode lowers to about $\frac{1}{10}$ as compared with that of the electrode made of metallic lithium alone. Lately, it is demanded to develop cells having high output and energy density and capable of conducting miniaturization and weight reduction with the advance of the technique for mobile phones, electric cars and the like.

Furthermore, it is recently demanded to develop compounds having fundamentally an excellent safety without the risk of ignition and the like in various fields. For example, there are studied techniques that the compound having an excellent safety without the risk of ignition or the like is included into an electrolyte in the secondary cell for backing up memories in AV-information equipments such as personal computers, VTR and the like or a power source for driving them or a paint for an aluminum can receiving the paint or a bottle of chemicals being high in the risk of ignition or the like under a high-temperature environment.

Even in the compounds having the excellent safety without the risk of ignition or the like, however, there are problems that they have a somewhat risk of ignition and are insufficient in the safety and halogen gas harmful in the environment such as chlorine gas, bromine gas or the like is generated. With the advance of the recent techniques, it is demanded to develop a method wherein various kinds of the compounds having a more excellent safety can be produced safely, cheaply and easily.

DISCLOSURE OF THE INVENTION

The invention is to solve the aforementioned problems of the conventional techniques and achieve the following objects. That is, it is an object of the invention to provide a non-aqueous electrolyte having high output and energy density and enabling miniaturization and weight reduction and suppressing the occurrence of dendrite and having excellent self-extinguishing property, fire retardant property, low-temperature characteristics and safety and a long service life.

It is another object of the invention to provide an electrode stabilizing agent having an excellent safety for electrode, electrolyte and the like while maintaining cell characteristics as a cell by adding to the electrolyte of the cell and being stable over a long period of time and capable of providing cells having excellent self-extinguishing property and fire retardant property as well as a non-aqueous electrolyte cell using such an electrode stabilizing agent and having an excellent long-running safety and further excellent self-extinguishing property and fire retardant property.

It is the other object of the invention to provide a phosphazene derivative having a low viscosity, a high boiling point and an excellent safety and suitable for various applications, particularly a non-combustible material, a cell and the like as well as a production method of a phosphazene derivative in which the phosphazene derivative can be produced safely, cheaply and easily.

Means for solving the above problems are as follows.
1. A non-aqueous electrolyte cell comprising a positive electrode, a negative electrode capable of occluding and releasing lithium or lithium ion, and a non-aqueous electrolyte containing a support salt and a phosphazene derivative.
2. A non-aqueous electrolyte cell according to the item 1, wherein the negative electrode is made of a lithium metal.
3. A non-aqueous electrolyte cell according to the item 1, wherein the negative electrode has a surface roughness (Ra) of not more than 0.6 mm.
4. A non-aqueous electrolyte cell according to the item 1, wherein a content of the phosphazene derivative in the non-aqueous electrolyte is at least 0.5% by volume.
5. A non-aqueous electrolyte cell according to the item 4, wherein the content of the phosphazene derivative in the non-aqueous electrolyte is at least 2% by volume.
6. A non-aqueous electrolyte cell according to the item 5, wherein the content of the phosphazene derivative in the non-aqueous electrolyte is at least 5% by volume.
7. A non-aqueous electrolyte cell according to the item 6, wherein the content of the phosphazene derivative in the non-aqueous electrolyte is at least 20% by volume.
8. A non-aqueous electrolyte cell according to the item 7, wherein the content of the phosphazene derivative in the non-aqueous electrolyte is at least 30% by volume.
9. A non-aqueous electrolyte cell according to the item 1, wherein the phosphazene derivative is represented by any one of the following general formulae (1) and (2):

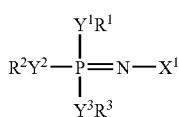

Formula (1)

(wherein each of $R^1$, $R^2$ and $R^3$ is a monovalent substituent or a halogen atom, $X^1$ is a group containing at least one element selected from the group consisting of carbon, silicon, germanium, tin, nitrogen, phosphorus, arsenic, antimony, bismuth, oxygen, sulfur, selenium, tellurium and polonium, and each of $Y^1$, $Y^2$ and $Y^3$ is a bivalent connecting group, a bivalent element or a single bond);

$$(PNR^4{}_2)_n \quad \text{Formula (2)}$$

(wherein $R^4$ is a monovalent substituent or a halogen atom and n is 3-14).

10. A non-aqueous electrolyte cell according to the item 1, wherein the non-aqueous electrolyte contains an aprotic organic solvent.
11. A non-aqueous electrolyte cell according to the item 10, wherein the aprotic organic solvent is a cyclic or chain ester compound or a chain ether compound.
12. A non-aqueous electrolyte cell comprising a positive electrode, a negative electrode made of a lithium metal, and a non-aqueous electrolyte $LiPF_6$, at least one of ethylene carbonate and propylene carbonate and more than 2.5% by volume of a phosphazene derivative.
13. A non-aqueous electrolyte cell comprising a positive electrode, a negative electrode made of a lithium metal, and a non-aqueous electrolyte $LiPF_6$, at least one of ethylene carbonate and propylene carbonate and 1.5-2.5% by volume of a phosphazene derivative.
14. An electrode stabilizing agent consisting of a phosphazene derivative having a group with a multiple bond other than phosphorus atom-nitrogen atom multiple bond in its molecular structure.
15. An electrode stabilizing agent according to the item 14, wherein the multiple bond other than phosphorus atom-nitrogen atom multiple bond is carbon atom-carbon atom multiple bond.
16. An electrode stabilizing agent according to the item 14 or 15, wherein multiple bond other than phosphorus atom-nitrogen atom multiple bond is a double bond.
17. An electrode stabilizing agent according to the item 14, wherein the group with multiple bond other than phosphorus atom-nitrogen atom multiple bond is at least one of allyl group and vinyl group.
18. A non-aqueous electrolyte cell characterized by comprising a positive electrode, a negative electrode capable of occluding and releasing lithium or lithium ion, and a non-aqueous electrolyte containing a support salt and an electrode stabilizing agent as described in any one of the items 14 to 17.
19. A phosphazene derivative represented by the following general formula (3):

$$(PNX_2)_n \quad \text{Formula (3)}$$

(wherein X is at least one of an alkoxy group, a phenoxy group and a fluorine atom and n is 3-14 provided that when n is 3, at least one of all Xs is a fluorine atom and at least the other one is an alkoxy group or a phenoxy group, and when n is 4-14, at least one of all Xs is a fluorine atom).

20. A phosphazene derivative according to the item 19, wherein the alkoxy group is selected from methoxy group, ethoxy group, allyloxy group, propoxy group and butoxy group.
21. A phosphazene derivative according to the item 19 or 20, wherein a viscosity is not more than 5 mPa·s (5 cP) at 25° C.
22. A phosphazene derivative according to any one of the items 19 to 21, wherein a boiling point is not lower than 100° C.

23. A phosphazene derivative according to the item 19, wherein n is 3, and one of all Xs is an alkoxy group or a phenoxy group and each of the remaining five Xs are a fluorine atom.

24. A phosphazene derivative according to the item 19, wherein n is 3, and one of two Xs bonded to two phosphorus atoms is an alkoxy group or a phenoxy group and the other is a fluorine atom and two Xs bonded to the other phosphorus atom are fluorine atoms.

25. A phosphazene derivative according to the item 19, wherein n is 3, and one of two Xs bonded to three phosphorus atoms is an alkoxy group or a phenoxy group and the other is a fluorine atom.

26. A non-aqueous electrolyte cell comprising a positive electrode, a negative electrode capable of occluding and releasing lithium or lithium ion, and a non-aqueous electrolyte containing a support salt and a phosphazene derivative as described in any one of the items 19 to 25.

27. A method of producing a phosphazene derivative, characterized in that at least one of an alkali metal alkoxide and an alkali metal phenoxide is reacted with a phosphazene derivative represented by the following general formula (4) to obtain a phosphazene derivative represented by the following general formula (3):

$(PNF_2)_n$   Formula (4)

(wherein n is 3-14)

$(PNX_2)_n$   Formula (3)

(wherein X is at least one of an alkoxy group, a phenoxy group and a fluorine atom and n is 3-14 provided that when n is 3, at least one of all Xs is a fluorine atom and at least the other one is an alkoxy group or a phenoxy group, and when n is 4-14, at least one of all Xs is a fluorine atom).

28. A method of producing a phosphazene derivative according to the item 27, wherein the alkali metal alkoxide is selected from sodium alkoxide, potassium alkoxide and lithium alkoxide.

29. A method of producing a phosphazene derivative according to the item 27, wherein the alkali metal phenoxide is selected from sodium phenoxide, potassium phenoxide and lithium phenoxide.

30. A method of producing a phosphazene derivative according to any one of the items 27 to 29, wherein the reaction is carried out under a temperature condition of −30 to 0° C. for 1-5 hours.

31. A method of producing a phosphazene derivative according to any one of the items 27 to 30, wherein after the reaction is carried out distillation.

32. A method of producing a phosphazene derivative, characterized in that a compound having at least one hydroxyl group in its molecular structure is reacted with a phosphazene derivative represented by the following general formula (4) to obtain a phosphazene derivative represented by the following general formula (3):

$(PNF_2)_n$   Formula (4)

(wherein n is 3-14)

$(PNX_2)_n$   Formula (3)

(wherein X is at least one of an alkoxy group, a phenoxy group and a fluorine atom and n is 3-14 provided that when n is 3, at least one of all Xs is a fluorine atom and at least the other one is an alkoxy group or a phenoxy group, and when n is 4-14, at least one of all Xs is a-fluorine atom).

33. A method of producing a phosphazene derivative according to the item 32, wherein the reaction is carried out by using a salt compound.

34. A method of producing a phosphazene derivative according to the item 33, wherein the salt compound is selected from sodium carbonate, potassium carbonate and cesium carbonate.

35. A method of producing a phosphazene derivative according to any one of the items 32 to 34, wherein the reaction is carried out under a temperature condition of 30-90° C. for 3-10 hours.

36. A method of producing a phosphazene derivative according to any one of the items 32 to 35, wherein the reaction is carried out by using a non-polar solvent.

37. A method of producing a phosphazene derivative according to any one of the items 32 to 35, wherein the reaction is carried out by using a polar solvent.

38. A method of producing a phosphazene derivative according to any one of the items 32 to 37, wherein the compound having at least one hydroxyl group in its molecular structure is selected from methanol, ethanol, allyl alcohol, propanol, butanol and phenol.

39. A method of producing a phosphazene derivative according to any one of the items 27 to 38, wherein the phosphazene derivative represented by the general formula (4) is obtained by fluorination using a phosphazene derivative represented by the following general formula (5) and a fluorinating agent:

$(PNY_2)_n$   Formula (5)

(wherein n is 3-14 and Y is a halogen atom other than fluorine).

40. A method of producing a phosphazene derivative according to the item 39, wherein the fluorinating agent is selected from sodium fluoride, potassium fluoride, lithium fluoride and cesium fluoride.

41. A method of producing a phosphazene derivative according to the item 39 or 40, wherein the fluorination is carried out under a temperature condition of 40-100° C. for 2-7 hours.

42. A method of producing a phosphazene derivative according to any one of the items 39 to 41, wherein the phosphazene derivative represented by the general formula (4) is added in the fluorination.

BEST MODE FOR CARRYING OUT THE INVENTION

Figure 1:
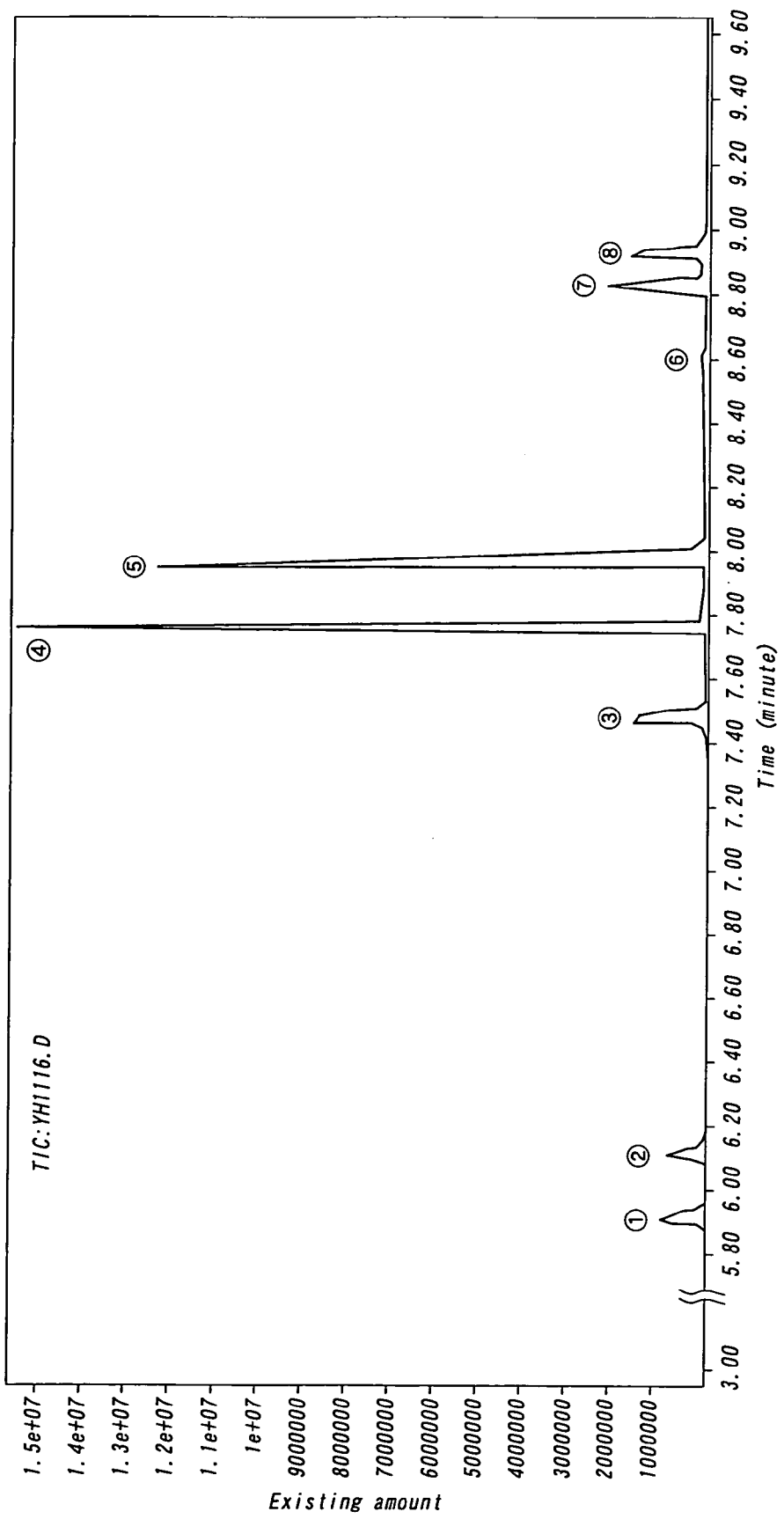
FIG. 1 is a chart showing an identification result (GC-MS chromatogram) of a molecular structure in the phosphazene derivative obtained in Example 5.

The invention will be described below.

The non-aqueous electrolyte cell according to the invention comprises a positive electrode, a negative electrode of a material capable of occluding and releasing lithium or lithium ion, and a non-aqueous electrolyte and contains the other members, if necessary.

—Positive Electrode—

The material for the positive electrode is not particularly limited and can be used by properly selecting from well-known materials for the positive electrode. For example, there are preferably mentioned a lithium metal itself; metal oxides such as $V_2O_5$, $V_6O_{13}$, $MnO_2$, $MoO_3$, $LiCoO_2$, $LiNiO_2$, $LiMn_2O_4$ and the like; metal sulfidex such as $TiS_2$, $MoS_2$ and the like; conductive polymers such as polyaniline and the like. Among them, $LiCoO_2$, $LiNiO_2$ and $LiMn_2O_4$ are particularly preferable because they are high in the capacity and safety and excellent in the wettability to the electrolyte. These materials may be used alone or in a combination of two or more. The shape of the positive electrode is not particularly limited and can be properly selected from well-known shapes as an electrode. For example, there are mentioned a sheet, a column, a plate, a spiral and the like.

—Negative Electrode—

The negative electrode is not particularly limited unless it can occlude and release lithium or lithium ion, and can be used by properly selecting from well-known materials for negative electrode. For instance, there are mentioned lithium metal itself; an alloy of lithium with aluminum, indium, lead, zinc or the like; carbon material such as graphite doped with lithium, and so on. Among them, the carbon material such as graphite or the like is preferable in view of a higher safety. These materials may be used alone or in a combination of two or more. The shape of the negative electrode is not particularly limited and can be properly selected from well-known shapes likewise the shape of the positive electrode.

Preferably, the negative electrode is made of lithium metal. In the invention, the precipitation of dendrite is preferably suppressed by including the phosphazene derivative in the non-aqueous electrolyte, so that it is possible to use the lithium metal itself as an active substance for the negative electrode and also there can be provided a safe and long-life cell having a very high theoretical capacity and enabling miniaturization and weight reduction.

A surface form of the negative electrode is preferable to be smooth in order to further effectively suppress the precipitation of dendrite. Concretely, the surface roughness (Ra) is preferable to be not more than 0.6 mm.

—Non-aqueous Electrolyte—

The non-aqueous electrolyte comprises a support salt and a phosphazene derivative, and contains the other components such as an aprotic organic solvent and the like, if necessary.

—Support Salt—

As the support salt, it is preferable to be a support salt as an ion source for the lithium ion or the like. The ion source for the lithium ion is not particularly limited and includes, for example, lithium salts such as $LiClO_4$, $LiBF_4$, $LiPF_6$, $LiCF_3SO_3$, $LiAsF_6$, $LiC_4F_9SO_3$, $Li(CF_3SO_2)_2N$, $Li(C_2F_5SO_2)_2N$ and the like. They may be used alone or in a combination of two or more.

The amount of the support salt compounded in the electrolyte is preferably 0.2-1 mol, more preferably 0.5-1 mol per 1 kg of the electrolyte (solvent component). When the compounding amount is less than 0.2 mol, the sufficient electric conductivity of the electrolyte can not be ensured and troubles may be caused in the discharge-recharge cycling property of the cell, while when it exceeds 1 mol, the viscosity of the electrolyte rises and the sufficient mobility of the lithium ion or the like can not be ensured and hence the sufficient electric conductivity of the electrolyte can not be ensured likewise the above case and troubles may be caused in the discharge-recharge cycling property of the cell.

—Phosphazene Derivative—

The reason why the electrolyte contains the phosphazene derivative is as follows. Heretofore, non-aqueous electrolytes based on the aprotic organic solvent are used as an electrolyte for a secondary battery. In such a non-aqueous electrolyte, however, the risk is high because when a large current is violently flown in the short-circuiting or the like to abnormally generate heat in the battery, vaporization-decomposition is caused to generate gas, or the explosion-ignition of the battery are caused by the generated gas and heat. On the other hand, when the phosphazene derivative is included in the conventional non-aqueous electrolyte, it is possible to reduce the above risk because the non-aqueous electrolyte can develop an excellent self-extinguishing property or fire retardant property under an action of nitrogen gas, halogen gas and the like derived from the phosphazene derivative. Also, phosphorus has an action of suppressing a chain decomposition of a high polymer material constituting the battery, which can effectively provide the self-extinguishing property or fire retardant property.

In the conventional secondary battery, it is considered that in the ester based electrolyte or the like used as an electrolyte, the lithium ion source or the like such as $LiPF_6$ or the like as a support salt is decomposed into LiF and $PF_5$ with the lapse of time and the corrosion is progressed by the resulting $PF_5$ gas, a hydrogen fluoride gas produced by further reacting the $PF_5$ gas with water or the like. That is, the electric conductivity of the electrolyte lowers but also there is caused a phenomenon that the electrode material is deteriorated by the generated hydrogen fluoride gas. On the contrary, the phosphazene derivative suppresses the decomposition of the lithium ion source such as $LiPF_6$ or the like and contributes to the stabilization. Therefore, it is possible to suppress the decomposition reaction of the electrolyte to control the corrosion and deterioration by adding the phosphazene derivative to the conventional electrolyte.

Furthermore, in the secondary battery using the lithium metal as an active substance for the negative electrode, there is a problem that lithium dissolved in the electrolyte as an ion in the discharge is partly precipitated as a dendrite (dendrite crystal) in the recharge to bring about internal short-circuiting, explosion and the like. On the other hand, when the phosphazene derivative is included in the electrolyte of the secondary battery using the lithium metal as an active substance for the negative electrode, the precipitation of dendrite is effectively suppressed and there is no risk such as the internal short-circuiting-explosion of the battery and the like and there is provided a safe and long-life secondary battery.

<Content of Phosphazene Derivative>

As a content of the phosphazene derivative in the non-aqueous electrolyte, there are four kinds of the contents, i.e. first content "capable of preferably suppressing the precipitation of dendrite", a second content capable of preferably giving "self-extinguishing property" to the non-aqueous electrolyte, a third content capable of preferably "fire retardant property" to the non-aqueous electrolyte and a fourth content capable of preferably giving "deterioration resistance" to the non-aqueous electrolyte in accordance with the effects obtained by the inclusion of the phosphazene derivative.

From a viewpoint of "capability of preferably suppressing the precipitation of dendrite", the first content of the phosphazene derivative in the non-aqueous electrolyte is preferably not less than 0.5% by volume, more preferably not less than 5% by volume.

From a viewpoint of "self-extinguishing property", the second content of the phosphazene derivative in the electrolyte is preferably not less than 20% by volume. When the content is less than 20% by weight, the sufficient "self-extinguishing property" may not be developed in the non-aqueous electrolyte. Moreover, the term "self-extinguishing property" used in the invention means a property that the ignited flame extinguishes at a line of 25-100 mm and the ignition is not observed in a falling object according to the following evaluation method.

From a viewpoint of "fire retardant property", the third content of the phosphazene derivative in the non-aqueous electrolyte is preferably not less than 30% by volume. When the content is not less than 30% by volume, it is possible to develop the sufficient "fire retardant property" in the non-aqueous electrolyte. In the invention, the term "fire retardant property" means a property that the ignited flame does not arrive at a line of 25 mm and the ignition is not observed in the falling object according to the following evaluation method.

In the invention, a property that no ignition is caused even by adding a test flame according to the following evaluation method, i.e. a property that a test flame does not ignite a test piece (combustion length: 0 mm) is "non-combustibility".

<<Evaluation Method of Self-extinguishing Property, Fire Retardant Property and Non-combustibility>>

The self-extinguishing property, fire retardant property and non-combustibility are evaluated by measuring a combustion behavior of a flame ignited under an atmospheric environment according to a method arranging UL94HB method of UL (Underwriting Laboratory) standard. In this case, the ignitability, combustibility, carbide formation and phenomenon in secondary ignition are also observed. Concretely, a test piece of 127 mm×12.7 mm is prepared by penetrating 1.0 ml of each of various electrolytes into a non-combustible quartz fiber based on UL test standard.

From a viewpoint of "self-extinguishing property or fire retardant property", the non-aqueous electrolyte is particularly preferable to be a case of containing the phosphazene derivative, $LiPF_6$ and at least one of ethylene carbonate and propylene carbonate. In this case, even if the content is small, the effect of the excellent self-extinguishing property or fire retardant property is developed irrespectively of the above description. That is, the content of the phosphazene derivative in the non-aqueous electrolyte is preferable to be 1.5-2.5% by volume in order to develop the self-extinguishing property and more than 2.5% by volume in order to develop the fire retardant property.

From a viewpoint of "deterioration resistance", the fourth content of the phosphazene derivative in the non-aqueous electrolyte is preferably not less than 2% by volume, more preferably not less than 2.5% by volume, further preferably not less than 3% by volume but less than 75% by volume. When the content is within the above numerical range, the deterioration can preferably be suppressed. Moreover, in the invention, the term "deterioration" means a decomposition of the support salt (e.g. lithium salt), and the effect of preventing the deterioration is evaluated by the following "evaluation method of stability".

<<Evaluation Method of Stability>>

(1) At first, a moisture content is measured after the preparation of the non-aqueous electrolyte containing the support salt. Then, a concentration of hydrogen fluoride in the non-aqueous electrolyte is measured by a high performance liquid chromatography (ion chromatography). Further, a color tone of the non-aqueous electrolyte is visually observed and thereafter a discharge-recharge capacity is calculated by a discharge-recharge test.

(2) After the non-aqueous electrolyte is left to stand in a globe box for 2 months, the moisture content and concentration of hydrogen fluoride are again measured and the color tone is observed and the discharge-recharge capacity is calculated, and then the stability is evaluated by the change of the thus obtained numerical values.

<Flash Point of Phosphazene Derivative>

The flash point of the phosphazene derivative is not particularly limited, but it is preferably not lower than 100° C., more preferably not lower than 150° C., further preferably not lower than 230° C., most preferably no flash in view of the control of ignition-combustion or the like. When the phosphazene derivative has a flash point of not lower than 100° C., the ignition or the like is suppressed and also even if the ignition or the like is caused in the interior of the cell, it is possible to lower the risk of catching fire and spreading over the surface of the electrolyte.

Moreover, the flash point concretely means a temperature that the flame spreads on the surface of the substance to cover at least 75% of the substance surface. The flash point is a measure for judging a tendency of forming a combustible mixture with air. In the invention, a value measured by the following miniflash method is used. That is, there is provided an apparatus of a closed cup system provided with a small measuring chamber of 4 ml, a heating cup, a flame, an ignition portion and an automatic flame detecting system (automatic ignition measuring apparatus)(MINIFLASH, made by GRABNR INSTRUMENTS), and then 1 ml of a sample to be measured is put into the heating cup and a cover is placed on the cup and thereafter the heating of the heating cup is started from a position above the cover. As a temperature of the sample is raised at a constant interval, a mixture of steam and air inside the cup is ignited at a constant temperature interval to detect flashing. A temperature when the flashing is detected is recognized as a flash point.

<Concrete Molecular Structure of Phosphazene Derivative>

The phosphazene derivative is preferable to have a substituent containing a halogen atom in its molecular structure. When the substituent containing the halogen atom is existent in the molecular structure, it is possible to more effectively develop the self-extinguishing property or fire retardant property in the electrolyte by a halogen gas derived from the phosphazene derivative. Also, the occurrence of halogen radical comes into problem in the compound having the substituent containing a halogen atom, but the phosphazene derivative does not cause such a problem because a phosphorus element in the molecular structure catches the halogen radical to form a stable phosphorus halide.

The content of the halogen atom in the phosphazene derivative is preferably 2-80% by weight, more preferably 2-60% by weight, further preferably 2-50% by weight. When the content is less than 2% by weight, the effect by the inclusion of the halogen atom may not sufficiently appear, while when it exceeds 80% by weight, the viscosity becomes higher and the electric conductivity may lower. As the halogen atom, fluorine, chlorine, bromine and the like are preferable, and fluorine is particularly preferable.

The phosphazene derivative is not particularly limited unless it is liquid at room temperature (25° C.), but chain phosphazene derivatives represented by the following general formula (1) and cyclic phosphazene derivatives represented by the following general formula (2) are preferable because they are excellent in the effect of suppressing the precipitation of dendrite and in the self-extinguishing property or fire retardant property:

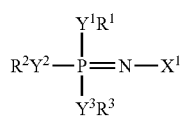

Formula (1)

(wherein each of $R^1$, $R^2$ and $R^3$ is a monovalent substituent or a halogen atom, $X^1$ is a group containing at least one element selected from the group consisting of carbon, silicon, germanium, tin, nitrogen, phosphorus, arsenic, antimony, bismuth, oxygen, sulfur, selenium, tellurium and polonium, and each of $Y^1$, $Y^2$ and $Y^3$ is a bivalent connecting group, a bivalent element or a single bond);

 Formula (2)

(wherein $R^4$ is a monovalent substituent or a halogen atom and n is 3-14).

In the formula (1), each of $R^1$, $R^2$ and $R^3$ is not particularly limited unless it is the monovalent substituent or the halogen atom. As the monovalent substituent are mentioned an alkoxy group, a phenoxy group, an alkyl group, a carboxyl group, an acyl group, an aryl group and so on. As the halogen atom are preferably mentioned, for example, the aforementioned halogen atoms. Among them, the alkoxy group is particularly preferable in a point that the viscosity of the electrolyte can be lowered. $R^1$ to $R^3$ may be the same kind of the substituent, or some of them may be different kinds of the substituents.

As the alkoxy group are mentioned, for example, methoxy group, ethoxy group, propoxy group, butoxy group, and alkoxy-substituted alkoxy groups such as methoxyethoxy group, methoxyethoxyethoxy group and the like, and so on. Among them, methoxy group, ethoxy group, methoxyethoxy group or methoxyethoxyethoxy group is preferable as all of $R^1$ to $R^3$, and methoxy group or ethoxy group is particularly preferable from a viewpoint of low viscosity and high dielectric constant.

As the alkyl group are mentioned methyl group, ethyl group, propyl group, butyl group, pentyl group and so on.

As the acyl group are mentioned formyl group, acetyl group, propionyl group, butylyl group, isobutylyl group, valelyl group and so on.

As the aryl group are mentioned phenyl group, tolyl group, naphthyl group and so on.

In these substituents, a hydrogen atom is preferable to be substituted with a halogen atom.

In the formula (1), as the group shown in $Y^1$, $Y^2$ and $Y^3$, there are mentioned $CH_2$ group and a group containing an element of oxygen, sulfur, selenium, nitrogen, boron, aluminum, scandium, gallium, yttrium, indium, lanthanum, thallium, carbon, silicon, titanium, tin, germanium, zirconium, lead, phosphorus, vanadium, arsenic, niobium, antimony, tantalum, bismuth, chromium, molybdenum, tellurium, polonium, tungsten, iron, cobalt, nickel or the like. Among them, $CH_2$ group, groups containing oxygen, sulfur, selenium or nitrogen and so on are preferable. Particularly, a case that $Y^1$, $Y^2$ and $Y^3$ contain sulfur or selenium is preferable because the self-extinguishing property or fire retardant property of the electrolyte is considerably improved. All of $Y^1$ to $Y^3$ are the same kind, or some of them may be different kinds.

In the formula (1), $X^1$ is preferable to be a group containing at least one element selected from the group consisting of carbon, silicon, nitrogen, phosphorus, oxygen and sulfur from a viewpoint of the consideration on hazardous property, environment and the like. A group having a structure represented by the following general formula (6) is more preferable:

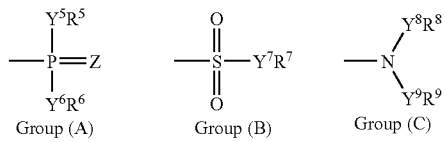

Formula (6)

Group (A)  Group (B)  Group (C)

In the formula (6), each of $R^5$ to R9 is a monovalent substituent or a halogen atom, and each of $Y^5$ to $Y^9$ is a bivalent connecting group, a bivalent element or a single bond, and Z is a bivalent group or a bivalent element.

As $R^5$ to $R^9$ in the formula (6) are preferably mentioned the same monovalent substituents or halogen atoms as mentioned in $R^1$ to $R^3$ of the formula (1). Also, they may be the same kind of some different kinds in the same group. $R^5$ and $R^6$ as well as $R^8$ and $R^9$ may be bonded to each other to form a ring.

As the groups of $Y^5$ to $Y^9$ in the formula (6) are mentioned the same bivalent substituents or bivalent groups as mentioned in $Y^1$ to $Y^3$ of the formula (1). Similarly, the group containing sulfur or selenium is particularly preferable because the self-extinguishing property or fire retardant property of the electrolyte is considerably improved. They may be the same kind or some different kinds in the same group.

As Z in the formula (6) are mentioned, for example, $CH_2$ group, CHR group (R is al alkyl group, an alkoxy group, a phenyl group or the like, and so forth.), NR group, a group containing an element of oxygen, sulfur, selenium, boron, aluminum, scandium, gallium, yttrium, indium, lanthanum, thallium, carbon, silicon, titanium, tin, germanium, zirconium, lead, phosphorus, vanadium, arsenic, niobium, antimony, tantalum, bismuth, chromium, molybdenum, tellurium, polonium, tungsten, iron, cobalt, nickel or the like, and so on. Among them, $CH_2$ group, CHR group, NR group and group containing an element of oxygen, sulfur or selenium are preferable. Particularly, the group containing sulfur or selenium is particularly preferable because the fire retardant property of the electrolyte is considerably improved.

As the group in the formula (6), the group containing phosphorus as shown by Group (A) is particularly preferable in view that the self-extinguishing property or fire retardant property can be effectively and preferably given. Also, the group containing sulfur as shown by Group (B) is especially preferable in a point that the interfacial resistance of the electrolyte is made small.

In the formula (2), $R^4$ is not particularly limited unless it is a monovalent substituent or a halogen atom. As the monovalent substituent are mentioned an alkoxy group, a phenoxy group, an alkyl group, a carboxyl group, an acyl group, an aryl group and so on. As the halogen atom are preferably mentioned the aforementioned halogen atoms. Among them, the alkoxy group, phenoxy group and the like are particularly preferable in view that the viscosity of the electrolyte can be reduced. As the alkoxy group are mentioned, for example, methoxy group, ethoxy group, methoxyethoxy group, propoxy group and so on. Among them, methoxy group, ethoxy group and methoxyethoxy group are particularly preferable. In these substituents, a hydrogen atom is preferable to be substituted with a halogen atom.

As the phosphazene derivative represented by the formula (2), it is preferable that $R^4$ is at least one of alkoxy group, phenoxyl group and fluorine and at least one of all $R^4$s is fluorine and at least another one thereof is alkoxy group or phenoxy group in view that the precipitation of dendrite can effectively be suppressed.

By properly selecting $R^1$ to $R^9$, $Y^1$ to $Y^3$, $Y^5$ to $Y^9$ and Z in the formulae (1), (2) and (6) can be synthesized electrolytes having a more preferable viscosity and a mixable solubility and the like. These phosphazene derivatives may be used alone of in a combination of two or more.

The phosphazene derivative is preferable to have a group containing a multiple bond other than phosphorus atom-nitrogen atom multiple bond in its molecular structure from a viewpoint of stabilizing the electrode included in the non-aqueous electrolyte. In this case, since the phosphazene derivative has the multiple bond other than phosphorus atom-nitrogen atom multiple bond in its molecular structure, when it is used in the cell, a stable film having a high ion conductivity is formed on the surface of the electrode in the recharge of the cell or the like and the reaction between the electrode and the electrolyte (i.e. decomposition reaction of the electrolyte) accompanied with the discharge-recharge of the cell or the like is suppressed and hence it is possible to preferably provide the cell being excellent in the cycle characteristics and the cell stability and stable over a long time of period. Therefore, the phosphazene derivative with a group containing a multiple bond other than phosphorus atom-nitrogen atom multiple bond in its molecular structure can be used as a electrode stabilizing agent.

As the multiple bond other than phosphorus atom-nitrogen atom multiple bond are mentioned, for example, carbon atom-carbon atom multiple bond, carbon atom-oxygen atom multiple bond, carbon atom-nitrogen atom multiple bond and so on. Among them, the carbon atom-carbon atom multiple bond, carbon atom-nitrogen atom multiple bond and the like are particularly preferable in a point that there can be preferably provided cells being more excellent in the cycle characteristics and excellent in the cell stability and stable over a long time of period.

As a form of the multiple bond other than phosphorus atom-nitrogen atom multiple bond are mentioned double bond, triple bond and the like. In case of the carbon atom-carbon atom multiple bond, the double bond is particularly preferable in a point that there can be preferably provided cells being further excellent in the cycle characteristics and excellent in the cell stability and stable over a long time of period.

As a concrete example of the group containing the multiple bond other than phosphorus atom-nitrogen atom multiple bond are mentioned, for example, allyl group, vinyl group, carboxyl group, acyl group (formyl group, acetyl group, propionyl group, butylyl group, isobutylyl group, valelyl group or the like) and so on. These groups may have another substituent (e.g. alkyl group, halogen atom or the like) or a connecting group (e.g. oxygen, nitrogen, phosphorus, carbon or the like), or these substituents or connecting groups may be bonded to each other to form a ring.

From a viewpoint of the stabilization of the electrode, the content of the phosphazene derivative with a group containing a multiple bond other than phosphorus atom-nitrogen atom multiple bond in its molecular structure in the non-aqueous electrolyte is preferably not less than 0.5% by volume, more preferably 1-5% by volume. When the content of the phosphazene derivative with a group containing a multiple bond other than phosphorus atom-nitrogen atom multiple bond in its molecular structure in the non-aqueous electrolyte is not less than 0.5% by volume, a stable film having a high ion conductivity is formed on the surface of the electrode in the recharge of the cell or the like and the reaction between the electrode and the electrolyte (i.e. decomposition reaction of the electrolyte) accompanied with the discharge-recharge of the cell or the like is suppressed and hence it is possible to preferably provide the cell being excellent in the cycle characteristics and the cell stability and stable over a long time of period.

The phosphazene derivative with a group containing a multiple bond other than phosphorus atom-nitrogen atom multiple bond in its molecular structure in the non-aqueous electrolyte is not particularly limited unless it is liquid at room temperature (25° C.). In a point that there can be preferably provided cells being excellent in the cycle characteristics and excellent in the cell stability and stable over a long time of period and the self-extinguishing property or fire retardant property is excellent, chain phosphazene derivative in which at least one of $R^1$ to $R^3$ and $X^1$ in the formula (1) is "a group containing a multiple bond other than phosphorus atom-nitrogen atom multiple bond", cyclic phosphazene derivative in which at least one of $R^4$s in the same molecule of the formula (2) is "a group containing a multiple bond other than phosphorus atom-nitrogen atom multiple bond" and the like are preferable.

As the phosphazene derivative represented by the formula (2) and having a group containing a multiple bond other than phosphorus atom-nitrogen atom multiple bond in its molecular structure, it is preferable that $R^4$ is at least one of alkoxy group, phenoxy group and fluorine, and at least one of $R^4$s is fluorine and at least another one thereof is alkoxy group or phenoxy group.

As the production method of the phosphazene derivative having the group containing a multiple bond other than phosphorus atom-nitrogen atom multiple bond in its molecular structure, there are mentioned a method wherein $(PNCl_2)_n$ (cyclic Cl body) is used as a starting material and fluorinated with a fluorinating agent (e.g. NaF or the like) in a solvent such as acetonitrile or the like under a temperature condition of 80° C. for 5 hours and distilled to obtain $(PNF_2)_n$ (cyclic F body), and then the resulting $(PNF_2)_n$ (cyclic F body) is reacted with an alcohol (allyl alcohol, vinyl alcohol or the like) in the presence of potassium carbonate in a solvent such as hexane or the like and distilled under a reduced pressure, and so on.

Among the phosphazene derivatives represented by the formula (2), a phosphazene derivative represented by the following general formula (3) is preferable from a viewpoint of giving non-combustibility to the electrolyte:

 Formula (3)

(wherein X is at least one of an alkoxy group, a phenoxy group and a fluorine atom and n is 3-14 provided that when n is 3, at least one of all Xs is a fluorine atom and at least the other one is an alkoxy group or a phenoxy group, and when n is 4-14, at least one of all Xs is a fluorine atom).

The phosphazene derivatives of the formula (3) indicate an excellent non-combustibility because X is at least one of an alkoxy group, a phenoxy group and a fluorine atom provided that when n is 3, at least one of all Xs is a fluorine atom and at least the other one is an alkoxy group or a phenoxy group, and when n is 4-14, at least one of all Xs is a fluorine atom.

Moreover, when all Xs in the formula (3) are alkoxy group or phenoxy group, the fire retardant property is indicated but the non-combustibility is not indicated. Also, when n is 3 and all Xs are fluorine, the non-combustibility is indicated, but the boiling point is very low, so that vaporization is immediately and unfavorably caused as the flame approaches. When n is not less than 4, the boiling point is high and an excellent non-combustible effect is developed, so that n is properly selected in accordance with the purpose. Moreover, the non-combustibility is evaluated by the aforementioned "evaluation method of self-extinguishing property, fire retardant property and non-combustibility".

The content of the phosphazene derivative represented by the formula (3) in the electrolyte is preferably not less than 10% by volume, more preferably not less than 15% by volume from a point that "non-combustibility" can be applied more preferably. When the content is less than 10% by volume, "non-combustibility" may not sufficiently be developed in the electrolyte.

From a viewpoint of "non-combustibility", a case comprising the phosphazene derivative of the formula (3), $LiPF_6$ and ethylene carbonate and/or propylene carbonate, and a case comprising the phosphazene derivative of the formula (3), $LiCF_3SO_3$ and propylene carbonate are particularly preferable as the electrolyte. In these cases, even if the content is small irrespectively of the aforementioned description, the excellent non-combustible effect is developed. That is, the content of the phosphazene derivative of the formula (3) in the electrolyte is preferable to be not less than 5% by volume for developing the non-combustibility.

The phosphazene derivative represented by the formula (3) is also excellent in the electric conductivity and low-temperature characteristics in addition to the non-combustibility in case of using as the electrolyte.

<Viscosity and Boiling Point of Phosphazene Derivative Represented by the Formula (3)>

The viscosity of the phosphazene derivative represented by the formula (3) is preferably not more than 5 mPa·s (5 cP) at 25° C., more preferably not more than 3 mPa·s (3 cP).

Since the phosphazene derivative of the formula (3) has one or more groups (fluorine atom) other than alkoxy group and phenoxy group as X, it is low in the viscosity and excellent in the handling and is preferably used in various fields.

Moreover, the viscosity is determined by using a viscosity measuring device (R-type viscometer Model RE500-SL, made by Toki Sangyo Co., Ltd.) and conducting the measurement at each revolution rate of 1 rpm, 2 rpm, 3 rpm, 5 rpm, 7 rpm, 10 rpm, 20 rpm and 50 rpm for 120 seconds to measure a viscosity under the revolution rate when an indication value is 50-60% as an analytical condition.

The boiling point of the phosphazene derivative represented by the formula (3) is preferably not lower than 100° C., more preferably not lower than 130° C. in a point that the non-combustible effect is well developed as the flame approaches.

<Concrete Molecular Structure of Phosphazene Derivative Represented by the Formula (3)>

As the alkoxy group shown by X in the formula (3) are mentioned, for example, methoxy group, ethoxy group, allyloxy group, propoxy group (n-propoxy group, 2-propoxy group or the like), butoxy group (2-butoxy group, tert-butoxy group or the like) and so on. Among them, the ethoxy group, allyloxy group, propoxy group such as n-propoxy group, 2-propoxy group or the like and butoxy group such as 2-butoxy group, tert-butoxy group or the like are preferable in view of a more excellent non-combustibility. Also, the ethoxy group, allyloxy group, propoxy group such as n-propoxy group, 2-propoxy group or the like and butoxy group such as 2-butoxy group, tert-butoxy group or the like are preferable in view of a lower viscosity. Further, the allyloxy group, propoxy group such as n-propoxy group, 2-propoxy group or the like and butoxy group such as 2-butoxy group, tert-butoxy group or the like are preferable in view of a higher boiling point. When the group shown by X is phenoxy group, the non-combustibility is excellent, and the viscosity is low, and the boiling point is high.

The alkoxy group or phenoxy group may be bonded with a halogen atom such as fluorine, chlorine, bromine or the like or another substituent. As the another substituent, there are, for example, trifluoromethyl group, trifluoroethoxy group, methylphenoxy group, aminophenoxy group and so on.

From a viewpoint of the non-combustibility, viscosity, boiling point and production easiness, as the phosphazene derivative, it is preferable to take a form that n in the formula (3) is 3 and one of Xs is alkoxy group or phenoxy group and the other five Xs are fluorine (form having a RO/F ratio of 1/5), a form that n in the formula (3) is 3 and one of two Xs bonded to two phosphorus atoms is alkoxy group or phenoxy group and the other one and two Xs bonded to the other phosphorus atoms are fluorine (form having a RO/F ratio of 2/4), a form that n in the formula (3) is 3 and one of two Xs bonded to three phosphorus atoms is alkoxy group or phenoxy group and the other one is fluorine (form having a RO/F ratio of 3/3) and so on.

<Identification of Phosphazene Derivative Represented by the Formula (3)>

The molecular structure of the phosphazene derivative represented by the formula (3) is identified by GC-MS, $^1$H-NMR and the like as follows.

By using NMR (made by Nippon Denshi Co., Ltd. "TNM-GX400") and GC-MS ("6890(GC)" and "5973(MS)" made by Asilent Co., Ltd. or "5890(GC)" made by Hewlett-Packard Co., Ltd. and "Automass system II (MS)" made by JEOL Co., Ltd.) are determined a structure of alkoxy group or phenoxy group through a chemical shift of $^1$H-NMR and the molecular structure is identified from MS spectrum of each peak in chromatogram obtained through GC-MS. Furthermore, it has been confirmed that phosphorus is included in each component by measuring a wavelength of phosphorus element (186 nm) through GC-AED (made by Hewlett-Packard Co., Ltd. "6890(GC), G2350A (AED)") and comparing with the obtained chromatogram. In case of the mixture, a peak area of each component in GC-AED chromatogram is determined to quantify each existing ratio.

Also, with respect to the phosphazene derivative having two or more of alkoxy groups or phenoxy groups in the formula (3), position isomers are identified by $^{31}$P-NMR as follows. That is, the structure of the isomer is confirmed by comparing chemical shifts of $^{31}$P-NMR and coupling constants in $(PNF_2)_3$, $(PN(OR)_2)_3$ (OR is alkoxy group or phenoxy group) and the phosphazene derivative of the formula (3).

<Other Applications of Phosphazene Derivative Represented by the Formula (3)>

The phosphazene derivatives represented by the formula (3) indicate the excellent non-combustibility as mentioned above, are low in the viscosity and high in the boiling point and do not release a halogen gas such as chlorine gas, bromine gas or the like, so that they are preferably used in various applications including a non-combustible material in addition to the non-aqueous electrolyte cell.

In case of using as the non-combustible material, it is preferable to use by applying to vessels having a risk of flash, ignition, explosion and the like such as aluminum can receiving a paint, bottles for chemicals having a high risk of ignition under a high-temperature environment or the like. As the non-combustible material, the phosphazene derivative represented by the formula (3) may be used alone or may be used together with the other solvent and the like. In this case, the phosphazene derivatives may be used alone or in a combination of two or more.

The production of the phosphazene derivative represented by the formula (3) is carried out by the following two production methods.

<First Production Method>

In the first production method, at least one of alkali metal alkoxide and alkali metal phenoxide is reacted with a phosphazene derivative represented by the following general formula (4) to obtain a phosphazene derivative represented by the following general formula (3):

$(PNF_2)_n$  Formula (4)

(wherein n is 3-14)

$(PNX_2)_n$  Formula (3)

(wherein X is at least one of an alkoxy group, a phenoxy group and a fluorine atom and n is 3-14 provided that when n is 3, at least one of all Xs is a fluorine atom and at least the other one is an alkoxy group or a phenoxy group, and when n is 4-14, at least one of all Xs is a fluorine atom).

<<Alkali Metal Alkoxide and Alkali Metal Phenoxide>>

The alkali metal alkoxide and alkali metal phenoxide are not particularly limited unless the phosphazene derivative of the formula (3) can be obtained by reacting with the phosphazene derivative of the formula (4), but include, for example, sodium alkoxide, sodium phenoxide, potassium alkoxide, potassium phenoxide, lithium alkoxide, lithium phenoxide and so on. Among them, sodium alkoxide is particularly preferable in points that the reactivity is high and the production efficiency is good and the cost is cheap.

As the alkoxy group in the alkali metal alkoxide is used a given alkoxy group introduced into the phosphazene derivative of the formula (4). As such an alkoxy group are mentioned, for example, methoxy group, ethoxy group, allyloxy group, propoxy group (n-propoxy group, 2-propoxy group or the like), butoxy group (2-butoxy group, tert-butoxy group or the like) and so on. Among them, the ethoxy group, allyloxy group, propoxy group such as n-propoxy group, 2-propoxy group or the like and butoxy group such as 2-butoxy group, tert-butoxy group or the like are preferable in a point that the phosphazene derivative obtained by the reaction indicates a more excellent non-combustibility. Also, the ethoxy group, allyloxy group, propoxy group such as n-propoxy group, 2-propoxy group or the like and butoxy group such as 2-butoxy group, tert-butoxy group or the like are preferable in a point that the viscosity of the phosphazene derivative obtained by the reaction is made low. Furthermore, the allyloxy group, propoxy group such as n-propoxy group, 2-propoxy group or the like and butoxy group such as 2-butoxy group, tert-butoxy group or the like are preferable in a point that the boiling point of the phosphazene derivative obtained by the reaction is made high.

The phenoxy group in the alkali metal phenoxide is preferable in a point that the resulting phosphazene derivative is excellent in the non-combustibility, low in the viscosity and high in the boiling point.

The alkoxy group or phenoxy group may be bonded with a halogen atom such as fluorine, chlorine, bromine or the like or another substituent. As another substituent, there are, for example, trifluoromethyl group, trifluoroethoxy group, methylphenoxy group, aminophenoxy group and so on.

<<Phosphazene Derivative Represented by the Formula (4)>>

In the formula (4), n is 3 to 14. Moreover, the phosphazene derivative represented by the formula (4) may be a mixture of phosphazene derivatives having any values of n=3-14. In view of stability and general purpose property (easiness of availability of starting materials and the like), n is most preferable to be 3.

The phosphazene derivative represented by the formula (4) is not particularly limited, but it is preferable to obtain by fluorination reaction using a phosphazene derivative represented by the following general formula (5) and a fluorinating agent:

$(PNY_2)_n$  Formula (5)

(wherein Y is a halogen atom other than fluorine and n is 3-14).

In the formula (5), Y is not particularly limited unless halogen atoms other than fluorine are used, but chlorine or the like is preferable in view of the stability, cost and the like. Although n is not particularly limited, 3 is most preferable in view of the production efficiency, cost, stability and the like.

The fluorinating agent is not particularly limited unless it is possible to fluorinate the phosphazene derivative of the formula (5), but includes, for example, sodium fluoride, lithium fluoride, cesium fluoride and so on. Among them, sodium fluoride is most preferable in view of the reactivity and the cost.

As a method of obtaining the phosphazene derivative of the formula (4) by fluorination reaction using the phosphazene derivative of the formula (5) and the fluorinating agent, it is preferable to react these components in the presence of a solvent under a temperature condition of 40-100° C. for 2-7 hours. Also, as a small amount of $(PNF_2)_n$ is added in the fluorination reaction, the reaction is promoted by catalytic action or the like, whereby it is possible to complete the reaction at a lower temperature (about 40-50° C.) for a shorter time (about 2 hours). For instance, the reaction can be preferably promoted by re-using the solvent used in the fluorination reaction (a small amount of $(PNF_2)_n$ remains) or the like, which is advantageous in view of the environment and the cost.

The solvent is not particularly limited, but includes, for example, acetonitrile, nitrobenzene, nitromethane, N,N-dimethylformamide, tetrahydrothiophene 1,1-dioxide and so on. These organic solvents may be used alone or in a combination of two or more.

If desired, the phosphazene derivative of the formula (4) can be purified by distillation or the like after the fluorination reaction. Also, it can be reacted with the alkali metal alkoxide in the same solvent without isolation, which is advantageous in view of the production efficiency.

<<Reaction>>

In the above reaction, at least one of the alkali metal alkoxide and the alkali metal phenoxide is reacted with the phosphazene derivative represented by the formula (4).

The reaction temperature is preferably −30 to 0° C., more preferably −20 to 0° C. from a viewpoint of the production efficiency. The reaction time is preferably 1-5 hours, more preferably 2-3 hours.

In the reaction, it is preferable to use an organic solvent. The organic solvent is not particularly limited, but includes, for example, hexane, acetonitrile, toluene, THF and so on. These organic solvents may be used alone or in a combination of two or more. After the reaction, the resulting product is subjected to a single distillation or a molecular distillation, if desired, whereby phosphazene derivatives having various compositions can be obtained as a mixture or as substantially a single composition.

<Second Production Method>

In the second production method, a compound having one or more hydroxyl groups at least in its molecular structure is reacted with a phosphazene derivative represented by the following general formula (4) to obtain a phosphazene derivative represented by the following general formula (3):

$(PNF_2)_n$  Formula (4)

(wherein n is 3-14)

$(PNX_2)_n$  Formula (3)

(wherein X is at least one of an alkoxy group, a phenoxy group and a fluorine atom and n is 3-14 provided that when n is 3, at least one of all Xs is a fluorine atom and at least the other one is an alkoxy group or a phenoxy group, and when n is 4-14, at least one of all Xs is a fluorine atom).

<<Compound Having One or More Hydroxyl Groups in its Molecular Structure>>

In the invention, the compound having one or more hydroxyl groups in its molecular structure (hereinafter abbreviated as a "hydroxyl group-containing compound") used for obtaining the phosphazene derivative of the formula (3) is cheap, easily available in various kinds, high in the safety and excellent in the handling. In the invention using the hydroxyl group-containing compound as a starting material, therefore, various kinds of the starting material are easily available, low in the cost, excellent in the safety and handling property, so that the production efficiency is good and the kind of the resulting phosphazene derivative (phosphazene derivative represented by the formula (3)) becomes many and the degree of freedom is high.

The hydroxyl group-containing compound is not particularly limited unless the hydroxyl group is included at least in the molecular structure, but includes, for example, methanol, ethanol, allyl alcohol, propanol (n-propanol, 2-propanol or the like), butanol (2-butanol, tert-butanol or the like), phenol and so on. Among them, methanol, ethanol and 2-propanol are preferable in a point that the cost is cheaper. Also, ethanol, propanol and butanol are preferable in a point that the safety is higher and the handling property is excellent.

In a point that the resulting phosphazene derivative (phosphazene derivative of the formula (3)) indicates a more excellent non-combustibility, ethanol, allyl alcohol, propanol such as n-propanol, 2-propanol or the like, butanol such as 2-butanol, tert-butanol or the like, and phenol are preferable.

In a point that the resulting phosphazene derivative (phosphazene derivative of the formula (3)) is lower in the viscosity, ethanol, allyl alcohol, propanol such as n-propanol, 2-propanol or the like, butanol such as 2-butanol, tert-butanol or the like, and phenol are preferable.

In a point that the resulting phosphazene derivative (phosphazene derivative of the formula (3)) is higher in the boiling point, allyl alcohol, propanol such as n-propanol, 2-propanol or the like, butanol such as 2-butanol, tert-butanol or the like, and phenol are preferable.

The hydroxyl group-containing compound may be further bonded with a halogen atom such as fluorine, chlorine, bromine or the like or another substituent. Such another substituent includes, for example, trifluoromethyl group, trifluoroethoxy group, methylphenoxy group, aminophenoxy group and so on.

<<Phosphazene Derivative Represented by the Formula (4)>>

The phosphazene derivative of the formula (4) in the second production method is the same as described in the first production method.

<<Reaction>>

In the above reaction, the hydroxyl group-containing compound is reacted with the phosphazene derivative of the formula (4).

It is preferable that the reaction is carried out by using a salt compound in view of the production efficiency and the like. As the salt compound are mentioned, for example, sodium carbonate, potassium carbonate, cesium carbonate and so on. Among them, cesium carbonate and potassium carbonate are preferable in view of the reaction efficiency and sodium carbonate is preferable in view of the cost.

The reaction temperature is preferably 30-90° C., more preferably 50-80° C. in view of the production efficiency. The reaction time is preferably 3-10 hours, more preferably 4-6 hours.

In the invention, a ratio of X (ratio of total number of alkoxy group and phenoxy group to fluorine number in all Xs (hereinafter may be called as "RO/F ratio") in the resulting phosphazene derivative (phosphazene derivative of the formula (3)) can be controlled to an approximately desired ratio by changing various conditions in the reaction.

By using a non-polar solvent in the above reaction can be selectively obtained a phosphazene derivative in which the RO/F ratio in the formula (3) is 1/5. Also, a phosphazene derivative in which the RO/F ratio in the formula (3) is 2/4 or 3/3 can be substantially selectively obtained by using a polar solvent.

The non-polar solvent is not particularly limited unless dipole moment of molecule constituting the solvent is zero or a lower value, but includes, for example, hexane, pentane, cyclohexane, toluene and so on. Among them, hexane is preferable in a point that the handling is easy and the coat is cheap.

The polar solvent is not particularly limited unless the molecule constituting the solvent has a dipole moment, but includes, for example, acetonitrile, tetrahydrofuran, acetone, nitrobenzene and so on. Among them, acetonitrile and tetrahydrofuran are particularly preferable in view of the easy handling.

—Other Components—

As the other component included in the non-aqueous electrolyte, an aprotic organic solvent is particularly preferable. It is preferable to include the aprotic organic solvent in the non-aqueous electrolyte in view of the safety. That is, when the aprotic organic solvent is included in the electrolyte, the high safety can be obtained without reacting with the material for the negative electrode. Also, it is possible to lower the viscosity of the electrolyte and an optimum ion conductivity as a non-aqueous electrolyte cell can be easily attained.

The aprotic organic solvent is not particularly limited, but includes ether compounds, ester compounds and the like in view of lowering the viscosity of the non-aqueous electrolyte. Concretely, there are mentioned 1,2-dimethoxy ethane, tetrahydrofuran, dimethyl carbonate, diethyl carbonate, diphenyl carbonate, ethylene carbonate, propylene carbonate, γ-butyrolactone, γ-valerolactone, methylethyl carbonate and so on. Among them, cyclic ester compounds such as ethylene carbonate, propylene carbonate, γ-butyrolactone and the like; chain ester compounds such as dimethyl carbonate, ethylmethyl carbonate, diethyl carbonate and the like; and chain ether compounds such as 1,2-dimethoxy ethane and the like are preferable. Particularly, the cyclic ester compound is preferable in view that the dielectric constant is high and the solubility of lithium salt or the like is excellent, and the chain ester compound and ether compound are preferable in view that the viscosity of the non-aqueous electrolyte is lowered because they are low in the viscosity. They may be used alone or in a combination of two or more, but the combination of two or more is preferable. The viscosity at 25° C. of the aprotic organic solvent is not particularly limited, but it is preferably not more than 10 mPa·s (10 cP), more preferably not more than 5 mPa·s (5 cP).

—Other Members—

As the other member used in the non-aqueous electrolyte cell is mentioned a separator interposed between the positive and negative electrodes in the non-aqueous electrolyte cell for preventing the occurrence of short-circuiting of current due to contact of these electrodes. A material for the separator is a material capable of surely preventing the contact of both the electrodes and passing or impregnating the electrolyte, which preferably includes non-woven fabric, thin layer film and the like of a synthetic resin such as polytetrafluoroethylene, polypropylene, polyethylene or the like. Among them, a microporous film made of polypropylene or polyethylene having a thickness of about 20-50 μm is particularly preferable. In addition to the separator, well-known members usually used in the cell are mentioned as the other member.

A conformation of the non-aqueous electrolyte cell according to the invention is not particularly limited, but preferably includes various well-known forms such as cylindrical cells of coin type, button type, paper type, rectangle or spiral structure and the like. In case of the spiral structure, a non-aqueous electrolyte cell can be manufactured, for example, by preparing a sheet-shaped positive electrode, sandwiching a collector between the positive electrodes, piling negative electrodes (sheet-shaped) thereon and then spirally winding them or the like.

The capacity of the cell is preferably 140-145 (mAh/g), more preferably 143-145 (mAh/g) as a discharge-recharge capacity (mAh/g) when $LiCoO_2$ is used as a positive electrode. Moreover, the discharge-recharge capacity can be measured by a well-known measuring method, for example, a method wherein a semi-opened type cell or a closed type coin cell (see Masayuki Yoshio, Lithium ion secondary battery, printed by Nikkan Kogyo Shinbun-sha) is used and subjected to discharge-recharge test to determine a capacity from recharge current (mA), time (t) and weight of electrode material (g).

In the above cell, the electric conductivity of the electrolyte (electric conduction degree) is preferable to be not less than 5 mS/cm as an electric conductivity of a solution of lithium salt having a concentration of 0.75 mol/L. Moreover, the electric conductivity is a value obtained by the following measurement method.

<<Method of Measuring Electric Conductivity>>

It is measured under given conditions (temperature: 25° C., pressure: atmospheric pressure, moisture content: not more than 10 ppm) using an electric conductivity meter (trade name: CDM210 type, made by Radio Meter Trading Co., Ltd.) while applying a constant current of 5 mA to the cell. Moreover, the electric conductivity K is theoretically obtained by firstly finding a conductance of an electrolyte (Gm), removing an influence of a cable resistance (R) from the conductance to find a conductance of the electrolyte itself (G) and determining K=G·K (S/cm) from the obtained (G) and a known cell constant (K).

The aforementioned non-aqueous electrolyte cells according to the invention are high in the output and energy density, excellent in the safety and long in the service life because when lithium metal is used alone as a negative electrode, the miniaturization and weight reduction are possible and the occurrence of dendrite in the negative electrode is suppressed. Therefore, they are particularly useful in applications requiring the establishment of various characteristics such as high output, high energy density, miniaturization, weight reduction, safety, long life and the like including mobile phones, electric cars and so on.

Also, the non-aqueous electrolyte cells according to the invention are excellent in the long-life stability and further excellent in the self-extinguishing property and fire retardant property when the phosphazene derivative having the group containing a multiple bond other than phosphorus atom-nitrogen atom multiple bond in its molecular structure is used as an electrode stabilizing agent.

The invention will be concretely described with reference to examples and comparative examples, but the invention is not limited to the following examples.

EXAMPLE 1

—Preparation of Non-aqueous Electrolyte—

To 47.5 ml of a mixed solvent of diethyl carbonate and ethylene carbonate (mixing ratio (volume ratio): diethyl carbonate/ethylene carbonate=1/1)(aprotic organic solvent) is added 2.5 ml (5% by volume) of a phosphazene derivative (cyclic EO/F type phosphazene derivative (ratio (EO/F) of ethoxy group (EO) to fluorine (F) in all $R^4$s at n=3 in the formula (2)=2/4) and further $LiPF_6$ (support salt) is dissolved in a concentration of 0.75 mol/kg to prepare a non-aqueous electrolyte.

<Evaluation of Self-extinguishing Property, Fire Retardant Property and Non-combustibility>

With respect to the thus obtained non-aqueous electrolyte, the evaluation of the self-extinguishing property, fire retardant property and non-combustibility is carried out in the same manner as in the aforementioned "evaluation method of self-extinguishing property, fire retardant property and non-combustibility". Concretely, a case that no ignition is caused by adding a test flame or a test piece is not ignited by the test flame (combustion length: 0 mm) is evaluated as "non-combustibility", and a case that the ignited flame does not arrive at a line of 25 mm and the ignition is not observed in the falling object is evaluated as "fire retardant property", and a case that the ignited flame extinguishes at a line of 25-100 mm and the ignition is not observed in a falling object is evaluated as "self-extinguishing property", and a case that the ignited flame exceeds a line of 100 mm is evaluated as "combustion property". The results are shown in Table 1.

—Preparation of Non-aqueous Electrolyte Cell—

A coin type non-aqueous electrolyte cell is prepared by using positive electrode and negative electrode each made of a lithium metal (thickness: 0.5 mm×13 mmφ (0.06637 $cm^3$), density (ρ)=0.534 $g/cm^3$ (0.0354 g), 34.2 mAh) and a microporous film of 25 μm in thickness (made of polypropylene) as a separator and combining with the above non-aqueous electrolyte.

<Measurement and Evaluation of Cell Characteristics>

With respect to the thus obtained cell, initial cell characteristics (voltage, internal resistance) are measured and evaluated, and then the discharge-recharge cycling property is measured and evaluated by the following evaluation method. These results are shown in Table 1.

<<Evaluation of Discharge-Recharge Cycling Property>>

The discharge-recharge cycling of 50 cycles is conducted under conditions of upper limit voltage: 4.5 V, lower limit voltage: 3.0 V, discharge current: 100 mA and recharge current: 50 mA. A capacity reducing ratio after 50 cycles is calculated by comparing a value of discharge-recharge capacity with an initial value of discharge-recharge capacity. The same measurement and evaluation as mentioned above are repeated with respect to three cells and an average value is calculated as an evaluation of the discharge-recharge cycling property.

<<Evaluation of Low-temperature Discharge Property (Measurement of Low-temperature Discharge Capacity>>

After the cell is recharged at room temperature (25° C.), it is discharged at a low temperature (−10° C.), and a discharge capacity at this low temperature is compared with a discharge capacity of the cell after the discharge-recharge cycling at 25° C. to calculate a reducing ratio of discharge capacity according to the following equation. The same measurement and evaluation as mentioned above are repeated with respect to three cells and an average value is calculated as an evaluation of the low-temperature discharge property. The results are shown in Table 1.

Reducing ratio of discharge capacity=(discharge capacity at low temperature/discharge capacity (25° C.))×100(%)   Equation <Evaluation on Effect of Suppressing Dendrite Precipitation>

After the discharge-recharge cycling of 1C is repeated at 25° C. 30 times, the cell is decomposed to visually observe inner surfaces of the positive electrode, negative electrode and separator and hence the precipitation of lithium is not observed without change.

COMPARATIVE EXAMPLE 1

The preparation of a non-aqueous electrolyte and the evaluation of self-extinguishing property, fire retardant property and non-combustibility are conducted in the same manner as in Example 1 except that the amount of the mixed solvent of diethyl carbonate and ethylene carbonate (mixing ratio (volume ratio) of diethyl carbonate/ethylene carbonate=1/1) (aprotic organic solvent) in "Preparation of non-aqueous electrolyte" of Example 1 is changed to 50 ml and the phosphazene derivative is not added. Also, a non-aqueous electrolyte cell is prepared in the same manner as in Example 1 and the initial cell characteristics (voltage, internal resistance), discharge-recharge cycling property and low-temperature discharge property are measured and evaluated, respectively. The results are shown in Table 1. Further, as the effect of suppressing dendrite precipitation is evaluated in the same manner as in Example 1, the growth of lithium crystal (dendrite) is confirmed on the surface of the negative electrode. Also, lithium metal is adhered to the surface of the separator. In addition, fine unevenness due to the precipitation of particulate lithium is observed on the surface of the positive electrode.

TABLE 1

| Example | Evaluation of self-extinguishing property, fire retardant property and non-combustibility | Initial voltage (V) | Initial internal resistance (Ω) | Initial electric conductivity (mS/cm) | Discharge-recharge cycling property (reducing ratio after 50 cycles) | Low-temperature property |
|---|---|---|---|---|---|---|
| Example 1 | non-combustibility | 2.8 | 0.09 | 6.3 | 1% | 75% |
| Comparative Example 1 | combustion property | 2.8 | 0.09 | 6.5 | 4% | 35% |

EXAMPLE 2

—Preparation of Electrolyte—

To 99.5 ml of a mixed solvent of diethyl carbonate and ethylene carbonate (mixing ratio (volume ratio): diethyl carbonate/ethylene carbonate=1/1)(aprotic organic solvent) is added 0.5 ml (0.5% by volume) of a phosphazene derivative (cyclic phosphazene derivative; compound of the formula (2) in which n=3, one of six $R^4$s is —O—$CH_2$—CH=$CH_2$ group and the remaining five are fluorine) (electrode stabilizing agent) and further $LiPF_6$ (support salt) is dissolved in a concentration of 0.75 mol/kg to prepare an electrolyte (non-aqueous electrolyte). With respect to the thus obtained electrolyte is carried out the aforementioned evaluation of "self-extinguishing property, fire retardant property and non-combustibility". The results are shown in Table 2.

<Evaluation of Deterioration>

With respect to the obtained non-aqueous electrolyte, the moisture content (ppm), hydrogen fluoride concentration (ppm) and discharge-recharge capacity (mAh/g) just after the preparation of the non-aqueous electrolyte and after the leaving in a globe box for 2 months are measured and evaluated in the same manner as in the aforementioned evaluation method of the deterioration to conduct the evaluation of deterioration. In this case, the discharge-recharge capacity (mAh/g) is determined by measuring a discharge-recharge curve using a known weight of a positive electrode or a negative electrode and dividing the resulting discharge quantity recharge quantity by the weight of the electrode used. Also, a change of color tone in the non-aqueous electrolyte just after the preparation of the non-aqueous electrolyte and after the leaving in a globe box for 2 months are observed visually. The results are shown in Table 2.

—Preparation of Cell—

A cobalt oxide represented by a chemical formula of $LiCoO_2$ is used as an active substance for positive electrode, and 10 parts of acetylene black (conductive assistant) and 10 parts of Teflon® binder (binding resin) are added to 100 parts of $LiCoO_2$ and milled with an organic solvent (mixed solvent of 50/50% by weight of ethyl acetate and ethanol), which is rolled to prepare a thin layer positive electrode sheet having a thickness of 100 μm and a width of 40 mm. Thereafter, an aluminum foil (collector) having a thickness of 25 μm and coated on its surface with a conductive adhesive is sandwiched between the two obtained positive electrode sheets, and a lithium metal foil of 150 μm in thickness is piled thereon through a separator of 25 μm in thickness (microporous film of polypropylene) and then they are wound up to prepare a cylinder type electrode assembly. In the cylinder type electrode assembly, a length of the positive electrode is about 260 mm. The above electrolyte is poured into the cylinder type electrode assembly and sealed to prepare a size AA lithium battery (non-aqueous electrolyte secondary cell).

<Measurement and Evaluation of Cell Characteristics>

With respect to the thus obtained cell, initial cell characteristics (voltage, internal resistance) are measured and evaluated, and then the discharge-recharge cycling property and low-temperature property are measured and evaluated by the following evaluation methods. These results are shown in Table 2.

<<Evaluation of Discharge-recharge Cycling Property>>

The discharge-recharge cycling of 50 cycles is conducted under conditions of upper limit voltage: 4.5 V, lower limit voltage: 3.0 V, discharge current: 100 mA and recharge current: 50 mA. A capacity reducing ratio after 50 cycles is calculated by comparing a value of discharge-recharge capacity with an initial value of discharge-recharge capacity. The same measurement and evaluation as mentioned above are repeated with respect to three cells and an average value is calculated as an evaluation of the discharge-recharge cycling property (evaluation of long-life stability of non-aqueous electrolyte).

<<Evaluation of Low-temperature Property (Measurement of Low-temperature Discharge Capacity>>

The discharge-recharge cycling of 50 cycles in the cell is conducted under the same conditions as in the above "evaluation of discharge-recharge cycling property" except that the temperature in the discharge is a low temperature (−10° C.). The discharge capacity at this low temperature is compared with a discharge capacity measured at 20° C. to calculate a reducing ratio of discharge capacity according to the following equation. The same measurement and evaluation as mentioned above are repeated with respect to three cells and an average value is calculated as an evaluation of the low-temperature property. The results are shown in Table 2.

Reducing ratio of discharge capacity=(discharge capacity at low temperature/discharge capacity (20° C.))×100(%)   Equation

EXAMPLE 3

An electrolyte is prepared in the same manner as in Example 2 except that the addition amount of the phosphazene derivative used in "Preparation of electrolyte" of Example 2 is changed to 30% by volume, and each evaluation is conducted thereto. Also, a cell is prepared in the same manner as in Example 2 and each evaluation is conducted. The results are shown in Table 2.

EXAMPLE 4

An electrolyte is prepared in the same manner as in Example 2 except that the phosphazene derivative used in "Preparation of electrolyte" of Example 2 is changed to a phosphazene derivative (cyclic phosphazene derivative: phosphazene derivative of the formula (2) in which n=3, one of six $R^4$s is —O—$CH_3$ group and the remaining five are fluorine atom), and each evaluation is conducted thereto. Also, a cell is prepared in the same manner as in Example 2 and each evaluation is conducted. The results are shown in Table 2.

TABLE 2

| Example | Evaluation of self-extinguishing property, fire retardant property and non-combustibility | Initial voltage (V) | Initial internal resistance (Ω) | Evaluation of discharge-recharge cycling property (capacity reducing ratio %) | Evaluation of low temperature property (capacity remaining ratio %) | Just after the preparation of electrolyte (evaluation of deterioration) | | |
|---|---|---|---|---|---|---|---|---|
| | | | | | | Discharge-recharge capacity (mAh/g) | HF concentration | Moisture content (ppm) |
| Example 2 | self-extinguishing | 2.6 | 0.09 | 1% | 70 | 140 | 2 | 2 |
| Example 3 | non-combustibility | 2.7 | 0.10 | 1% | 70 | 140 | 1 | 2 |
| Example 4 | self-extinguishing | 2.6 | 0.09 | 5% | 65 | 140 | 2 | 2 |

| | Leaving for 2 months (in globe box) (evaluation of deterioration) | | | | |
|---|---|---|---|---|---|
| Example | Discharge-recharge capacity (mAh/g) | HF concentration | Moisture content (ppm) | Change of color tone | Evaluation of deterioration |
| Example 2 | 139 | 2 | 2 | none | none |
| Example 3 | 139 | 1 | 2 | none | none |
| Example 4 | 138 | 2 | 2 | none | none |

As seen from Table 2, in Examples 2 and 3, the discharge-recharge cycling property (long-life stability) is particularly excellent as compared with that of Example 4, and the decomposition reaction of the non-aqueous electrolyte is suppressed and the stability of the electrode is excellent.

EXAMPLE 5

—Synthesis of Phosphazene Derivative—

As a starting material is used $(PNCl_2)_3$, which is fluorinated with a fluorinating agent (NaF) in the presence of acetonitrile solvent under a temperature condition of 80° C. for 5 hours and distilled to obtain $(PNF_2)_3$. Then, the resulting $(PNF_2)_3$ is reacted with a sodium salt ($CH_3ONa$) in the presence of hexane solvent under a temperature condition of −10° C. for 2 hours and subjected to a molecular distillation to obtain a purified phosphazene derivative. The thus obtained phosphazene derivative has a viscosity at 25° C. of 3.9 mPa·s (3.9 cP).

Figure 2:
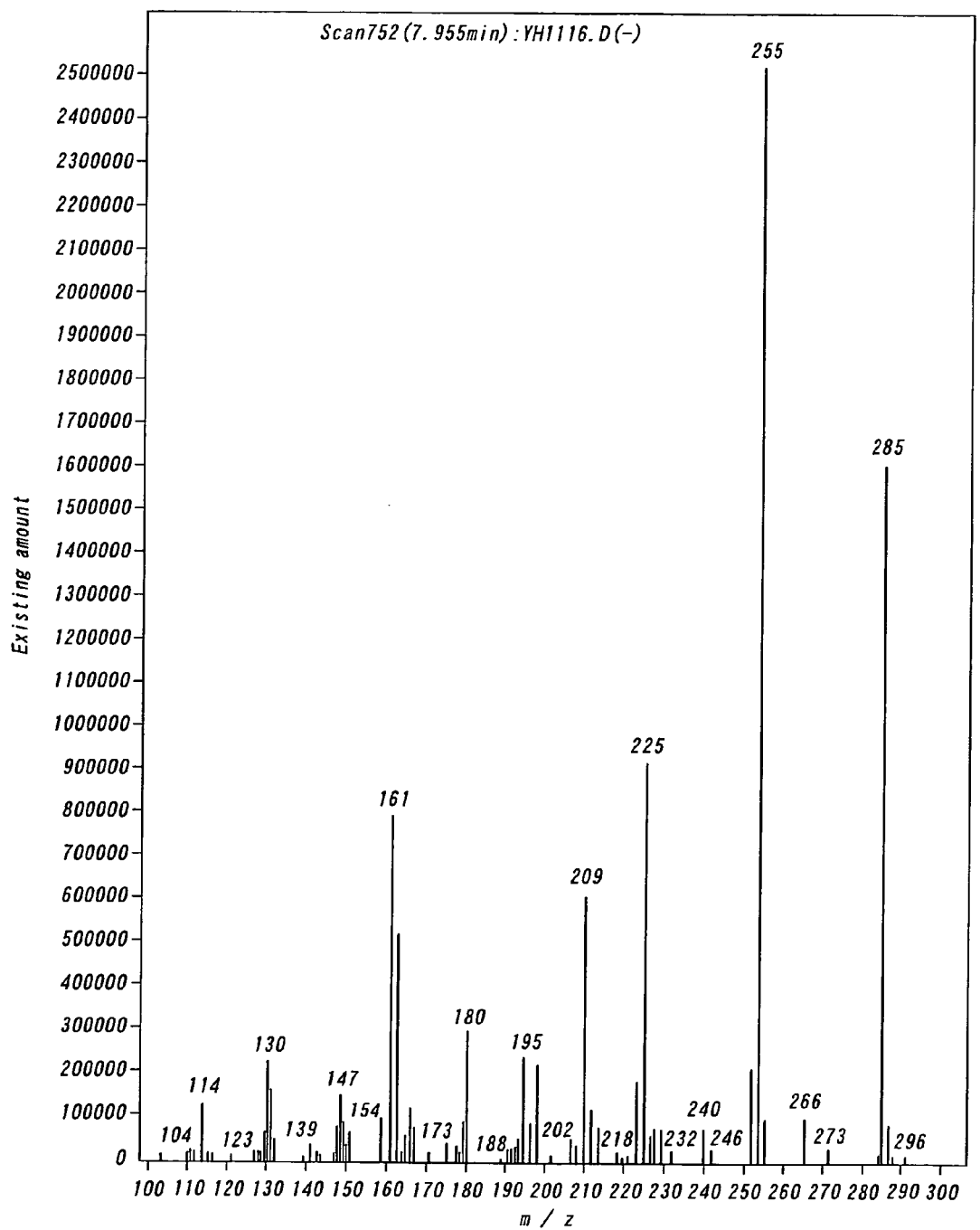
FIG. 2 is a chart showing an identification result (MS spectrum of a given component) of a molecular structure in the phosphazene derivative obtained in Example 5.
Figure 3:
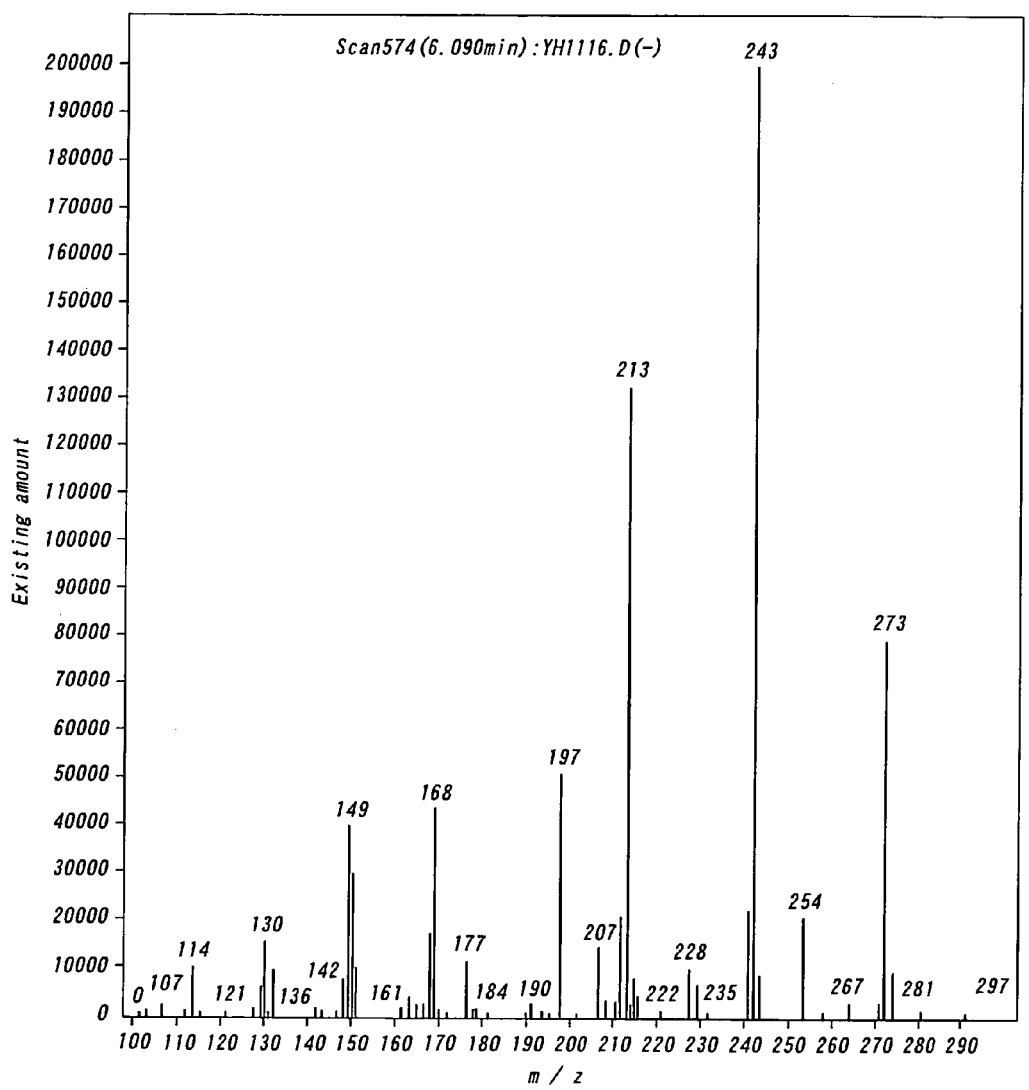
FIG. 3 is a chart showing an identification result (MS spectrum of a given component) of a molecular structure in the phosphazene derivative obtained in Example 5.
Figure 4:
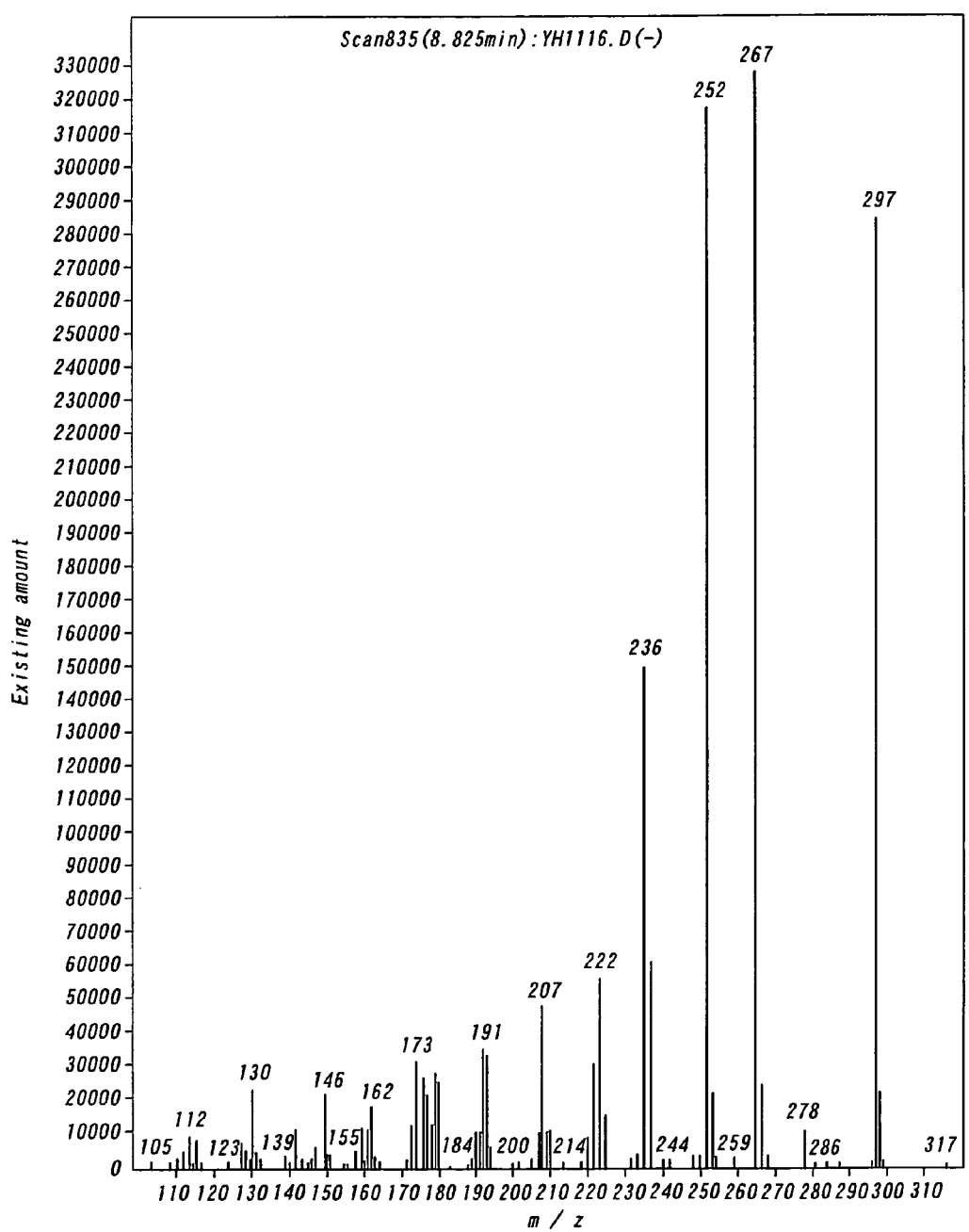
FIG. 4 is a chart showing an identification result (MS spectrum of a given component) of a molecular structure in the phosphazene derivative obtained in Example 5.

As regards the obtained phosphazene derivative, an identification result of GC-MS (chromatogram) is shown in FIG. 1, and MS spectrum of each component is shown in FIGS. 2-4, respectively.

In FIG. 1, ① and ② show peaks of chromatogram based on the phosphazene derivative having a structure that a ratio of methoxy group (MO) to fluorine (F) in all Xs of the formula (3) (MO/F ratio) is 2/4, wherein peaks of ① and ② are phosphazene derivatives having an interrelation of steric isomers (cis-trans). ③, ④ and ⑤ show peaks based on the phosphazene derivative having a structure that a ratio of methoxy group (MO) to fluorine (F) in all Xs of the formula (3) (MO/F ratio) is 3/3, wherein peaks of ③, ④ and ⑤ are phosphazene derivatives having an interrelation of position isomers (geminal, non-geminal). Peaks of ④ and ⑤ are phosphazene derivatives having an interrelation of steric isomers (cis-trans). ⑥, ⑦ and ⑧ show peaks based on the phosphazene derivative having a structure that a ratio of methoxy group (MO) to fluorine (F) in all Xs of the formula (3) (MO/F ratio) is 3/3, wherein peaks of ⑥, ⑦ and ⑧ are phosphazene derivatives having an interrelation of position isomers (geminal, non-geminal). Peaks of ⑦ and ⑧ are phosphazene derivatives having an interrelation of steric isomers (cis-trans).

FIG. 2 shows MS spectrum of the phosphazene derivative having a MO/F ratio of 3/3 (molecular weight: 285), and FIG. 3 shows MS spectrum of the phosphazene derivative having a MO/F ratio of 2/4 (molecular weight: 273), and FIG. 4 shows MS spectrum of the phosphazene derivative having a MO/F ratio of 4/2 (molecular weight: 297).

Moreover, as the structure of the isomer is confirmed by comparing chemical shifts of $^{31}$P-NMR and coupling constants in $(PNF_2)_3$, $(PN(OCH_3)_2)_3$ and the above phosphazene derivatives, there is almost a structure that one of two Xs bonded to phosphorus atom is fluorine and the remaining one is methoxy group. Thus, it is judged that among three peaks having the same MS spectrum obtained by GC-MS chromatogram, smallest intensity is a peak of geminal structure having two methoxy groups in the same phosphorus atom, and the remaining two peaks having close holding times show steric isomers of non-geminal structure (cis-trans).

From FIGS. 1-4, it is confirmed that the resulting phosphazene derivative is a mixture of components in which the ratio of methoxy group (MO) to fluorine (F) in all Xs of the formula (3) (MO/F ratio) is 2/4, 3/3 and 4/2. Further, it is confirmed by GC-AED that in the resulting mixture, a compounding amount of 2/4 component as MO/F ratio is 3% by mass, and a compounding amount of 3/3 component is 88% by mass, and a compounding amount of 4/2 component is 9% by mass.

<Evaluation of Non-combustibility>

With respect to the obtained phosphazene derivatives, the combustion behavior of a flame ignited under an atmospheric environment is measured and evaluated according to a method arranging UL94HB method of UL (Underwriting Laboratory) standard. The results are shown in Table 4. In this case, the ignitability, combustibility, carbide formation and phenomenon in secondary ignition are also observed. Concretely, a test piece of 127 mm×12.7 mm is prepared by penetrating 1.0 ml of each of various electrolytes into a non-combustible quartz fiber based on UL test standard. A case that no ignition is caused by adding a test flame or a test piece is not ignited by the test flame (combustion length: 0 mm) is evaluated as "non-combustibility", and a case that the ignited flame does not arrive at a line of 25 mm and the ignition is not observed in the falling object is evaluated as "fire retardant property", and a case that the ignited flame extinguishes at a line of 25-100 mm and the ignition is not observed in a falling object is evaluated as "self-extinguishing property", and a case that the ignited flame exceeds a line of 100 mm is evaluated as "combustion property".

Moreover, the evaluation of non-combustibility and boiling point of the phosphazene derivative synthesized in Example 5 (cyclic $CH_3O/F$ body) are compared with the evaluation of non-combustibility and boiling point of $(PNF_2)_3$ and $(PN(OCH_3)_2)_3$ in Table 3.

TABLE 3

| Phosphazene derivative | Evaluation of non-combustibility | Boiling point (° C.) |
|---|---|---|
| Phosphazene derivative synthesized in Example 5 | non-combustibility | 150-290 |
| $(PNF_2)_3$ | non-combustibility | 51 |
| $(PN(OCH_3)_2)_3$ | fire retardant property | 352 |

—Preparation of Electrolyte—

The phosphazene derivative is mixed with an aprotic organic solvent (mixed solvent of ethylene carbonate and diethyl carbonate (ethylene carbonate/diethyl carbonate (volume ratio)=1/1)) and further added with $LiPF_6$ to obtain an electrolyte having a content of phosphazene derivative of 5% by volume and a $LiPF_6$ concentration of 0.75M (viscosity at 25° C.=3.9 mPa·s (3.9 cP)).

—Preparation of Cell—

A size AA lithium battery is prepared in the same manner as in Example 2 by using the above electrolyte and the measurement and evaluation of cell characteristics and the like are conducted in the same manner as in Example 2. Also, the electric conductivity (electric conduction degree) is measured. The results are shown in Table 4.

EXAMPLE 6

A phosphazene derivative is obtained in the same manner as in Example 5 except that the sodium salt in "Synthesis of phosphazene derivative" of Example 5 is changed to $CH_3CH_2ONa$. The resulting phosphazene derivative has a viscosity at 25° C. of 1.4 mPa·s (1.4 cP).

Figure 5:
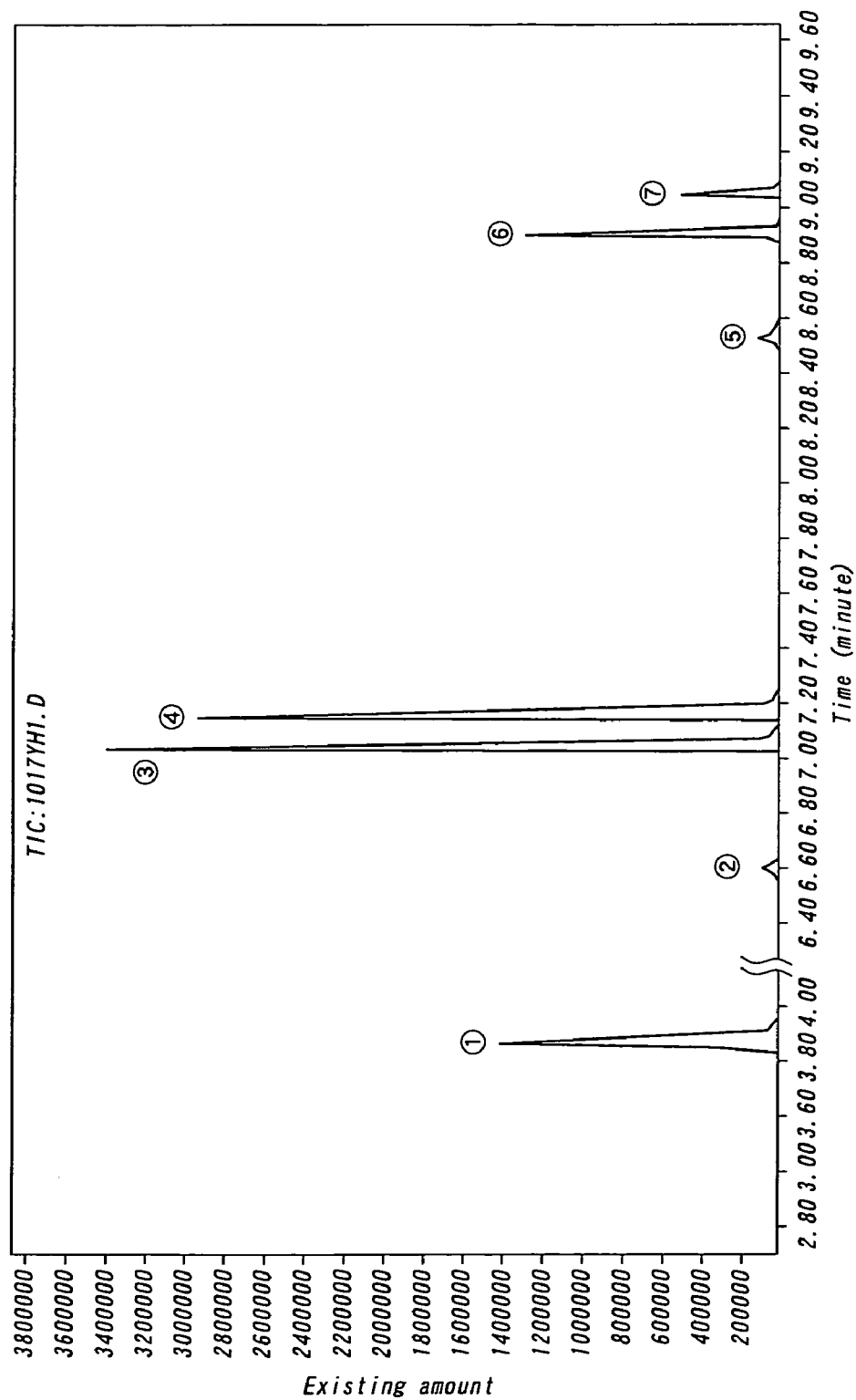
FIG. 5 is a chart showing an identification result (GC-MS chromatogram) of a molecular structure in the phosphazene derivative obtained in Example 6.
Figure 6:
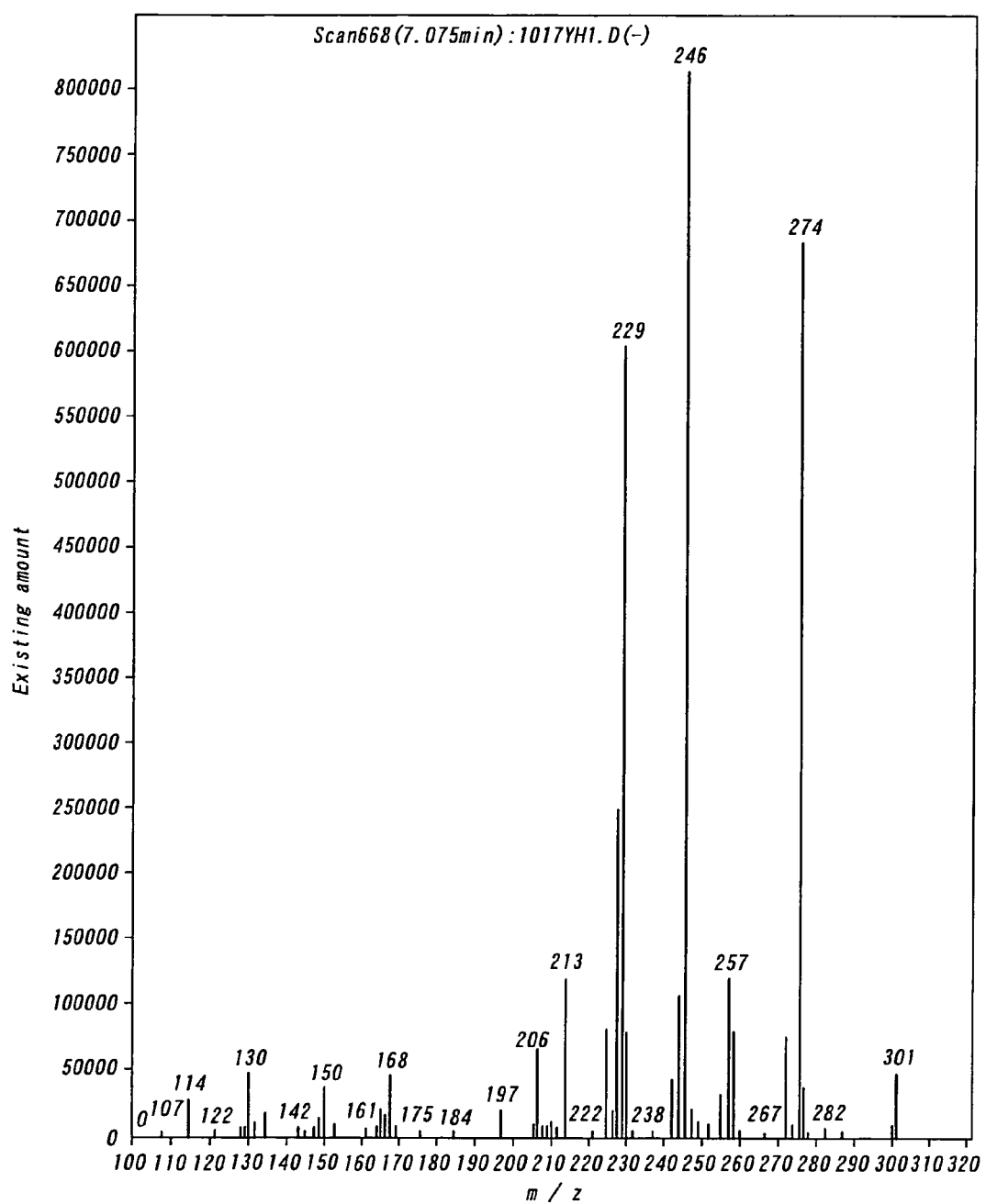
FIG. 6 is a chart showing an identification result (MS spectrum of a given component) of a molecular structure in the phosphazene derivative obtained in Example 6.
Figure 7:
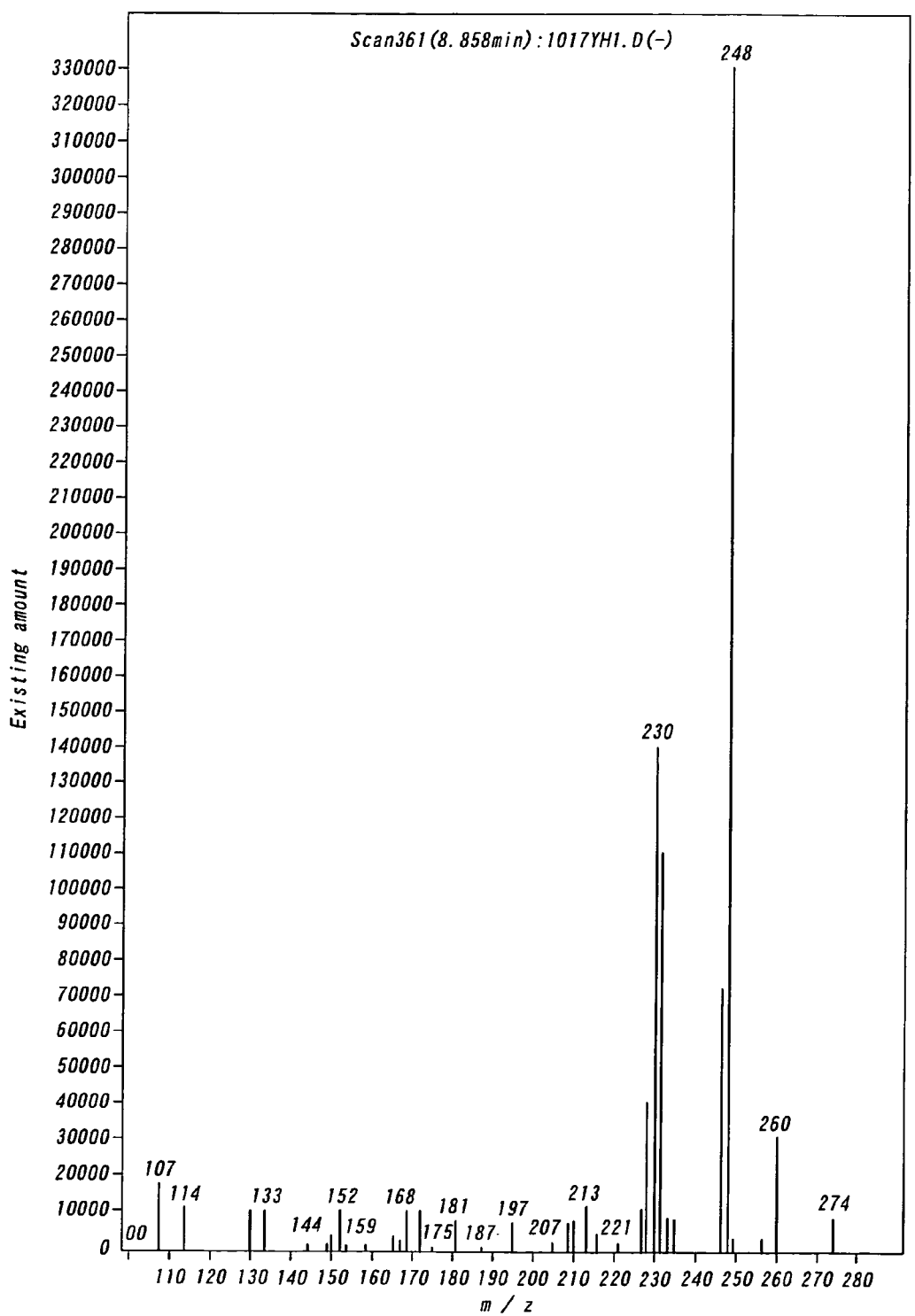
FIG. 7 is a chart showing an identification result (MS spectrum of a given component) of a molecular structure in the phosphazene derivative obtained in Example 6.
Figure 8:
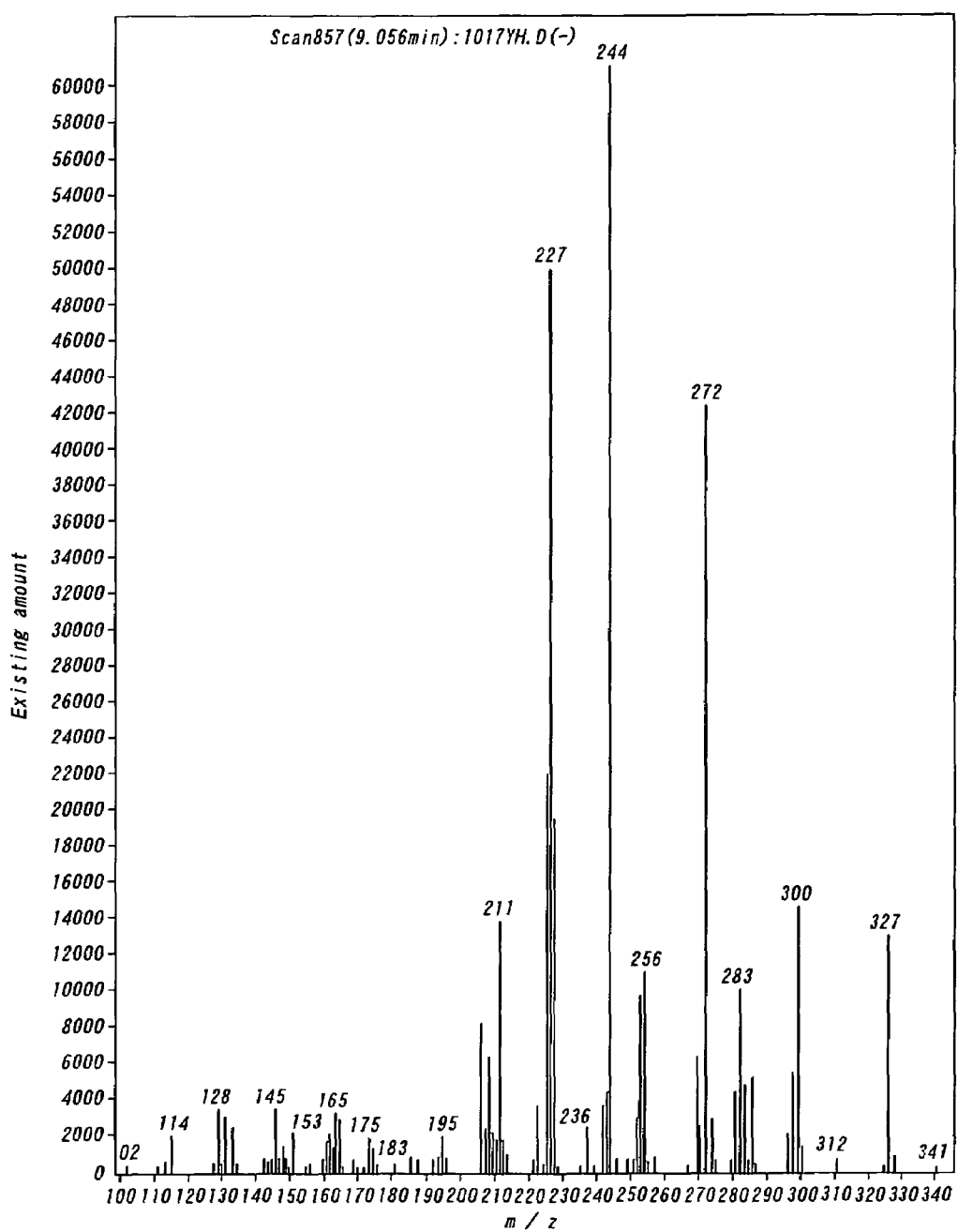
FIG. 8 is a chart showing an identification result (MS spectrum of a given component) of a molecular structure in the phosphazene derivative obtained in Example 6.

In the obtained phosphazene derivative, the identification result of GC-MS (chromatogram) is shown in FIG. 5, and MS spectrum of each component is shown in FIGS. 6-8, respectively.

In FIG. 5, ① shows a peak of chromatogram based on the phosphazene derivative having a structure that a ratio of ethoxy group (EO) to fluorine (F) in all Xs of the formula (3) (EO/F ratio) is 1/5. ②, ③ and ④ show peaks based on the phosphazene derivative having a structure that a ratio of ethoxy group (EO) to fluorine (F) in all Xs of the formula (3) (EO/F ratio) is 2/4, wherein peaks of ②, ③ and ④ are phosphazene derivatives having an interrelation of position isomers (geminal, non-geminal). Peaks of ③ and ④ are phosphazene derivatives having an interrelation of steric isomers (cis-trans). ⑤, ⑥ and ⑦ show peaks based on the phosphazene derivative having a structure that a ratio of ethoxy group (EO) to fluorine (F) in all Xs of the formula (3) (EO/F ratio) is 3/3, wherein peaks of ⑤, ⑥ and ⑦ are phosphazene derivatives having an interrelation of position isomers (geminal, non-geminal). Peaks of ⑥ and ⑦ are phosphazene derivatives having an interrelation of steric isomers (cis-trans).

FIG. 6 shows MS spectrum of the phosphazene derivative having an EO/F ratio of 2/4 (molecular weight: 301), and FIG. 7 shows MS spectrum of the phosphazene derivative having an EO/F ratio of 1/5 (molecular weight: 274), and FIG. 8 shows MS spectrum of the phosphazene derivative having an EO/F ratio of 3/3 (molecular weight: 327).

Moreover, as the structure of the isomer is confirmed by comparing chemical shifts of $^{31}$P-NMR and coupling constants in $(PNF_2)_3$, $(PN(OCH_3)_2)_3$ and the above phosphazene derivatives, there is almost a structure that one of two Xs bonded to phosphorus atom is fluorine atom and the remaining one is ethoxy group. Thus, it is judged that among three peaks having the same MS spectrum obtained by GC-MS chromatogram, smallest intensity is a peak of geminal structure having two ethoxy groups in the same phosphorus atom, and the remaining two peaks having close holding times show steric isomers of non-geminal structure (cis-trans).

From FIGS. 5-8, it is confirmed that the resulting phosphazene derivative is a mixture of components in which the ratio of ethoxy group (EO) to fluorine (F) in all Xs of the formula (3) (EO/F ratio) is 1/5, 2/4 and 3/3. Further, it is confirmed by GC-AED that in the resulting mixture, a compounding amount of 1/5 component as EO/F ratio is 34% by mass, and a compounding amount of 2/4 component is 60% by mass, and a compounding amount of 3/3 component is 6% by mass.

Then, the evaluation of non-combustibility is conducted in the same manner as in Example 5, and an electrolyte (viscosity at 25° C.=3.3 mPa·s (3.3 cP)) is prepared and a cell is prepared, and the measurement and evaluation of cell characteristics and the like are conducted. The results are shown in Table 4.

COMPARATIVE EXAMPLE 2

An electrolyte (viscosity at 25° C.=3.4 mPa·s (3.4 cP)) is prepared in the same manner as in Example 5 except that "Synthesis of phosphazene derivative" in Example 5 is not carried out and a phosphazene derivative is not mixed with the aprotic organic solvent (mixed solvent of ethylene carbonate and diethyl carbonate (ethylene carbonate/diethyl carbonate (volume ratio)=1/1)), and a cell is prepared, and the measurement and evaluation of cell characteristics and the like are conducted. Also, the evaluation of non-combustibility in the mixed solvent of ethylene carbonate and diethyl carbonate is conducted. The results are shown in Table 4.

TABLE 4

| Example | Evaluation of non-combustibility | Initial voltage (V) | Initial internal resistance (Ω) | Initial electric conductivity (mS/cm) | Discharge-recharge cycling property (after 50 cycles) | Low-temperature property |
|---|---|---|---|---|---|---|
| Example 5 | non-combustibility | 2.8 | 0.11 | 6.8 | less than 4% | 70% |
| Example 6 | non-combustibility | 2.8 | 0.10 | 7.5 | less than 4% | 89% |
| Comparative Example 2 | combustion property | 2.7 | 0.10 | 7.5 | less than 15% | 21% |

EXAMPLE 7

—Synthesis of Phosphazene Derivative—

$(PNCl_2)_3$ is fluorinated with a fluorinating agent (NaF) in the presence of acetonitrile solvent under a temperature condition of 80° C. for 5 hours and distilled to obtain $(PNF_2)_3$. Then, the resulting $(PNF_2)_3$ is reacted with ethanol and sodium carbonate (salt compound: $Na_2CO_3$) in the presence of hexane (non-polar solvent) under a temperature condition of 70° C. for 5 hours and subjected to a molecular distillation to obtain a purified phosphazene derivative. The resulting phosphazene derivative has a viscosity at 25° C. of 1.1 mPa·s (1.1 cP).

Figure 9:
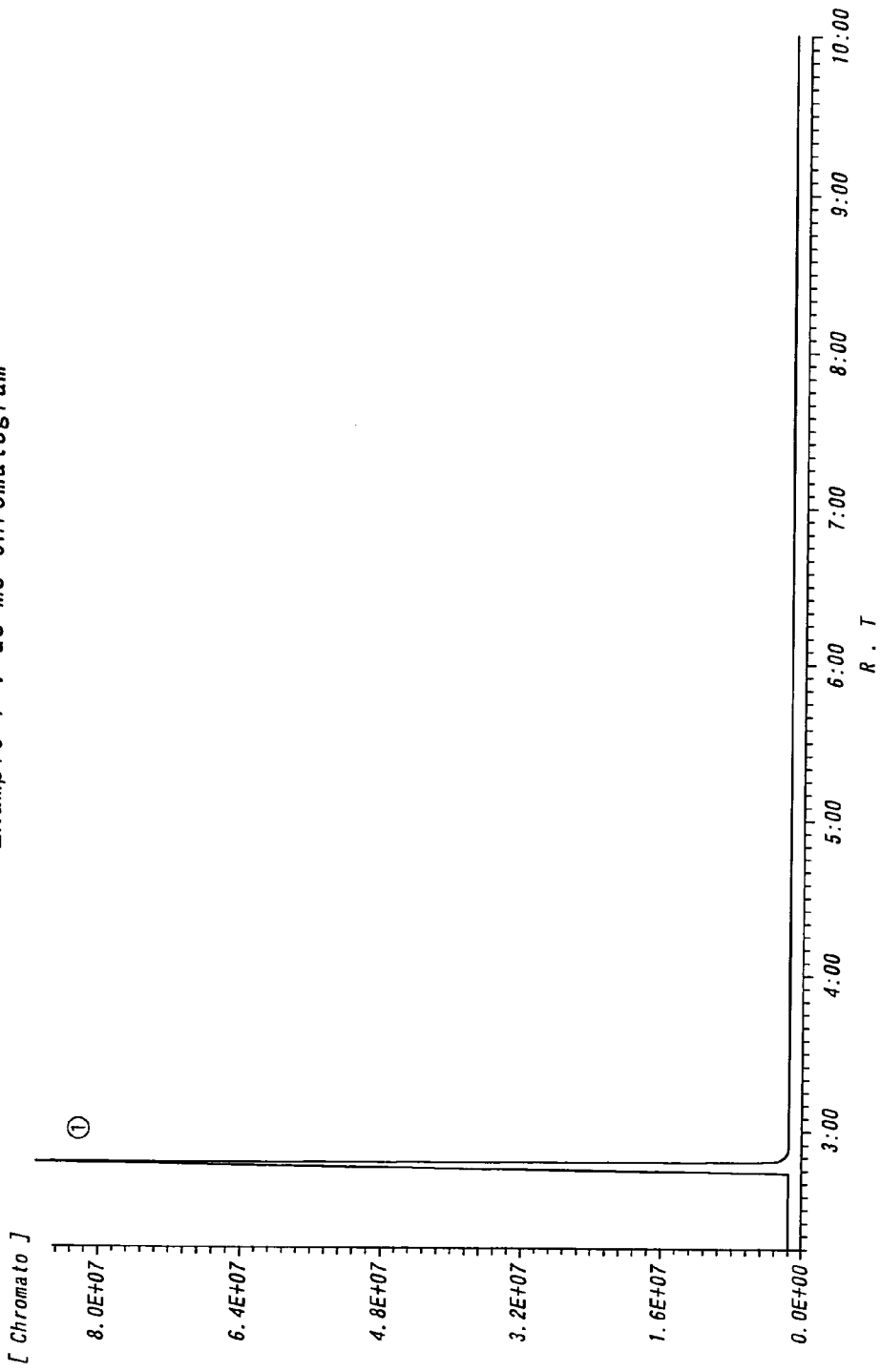
FIG. 9 is a chart showing an identification result (GC-MS chromatogram) of a molecular structure in the phosphazene derivative obtained in Example 7.
Figure 10:
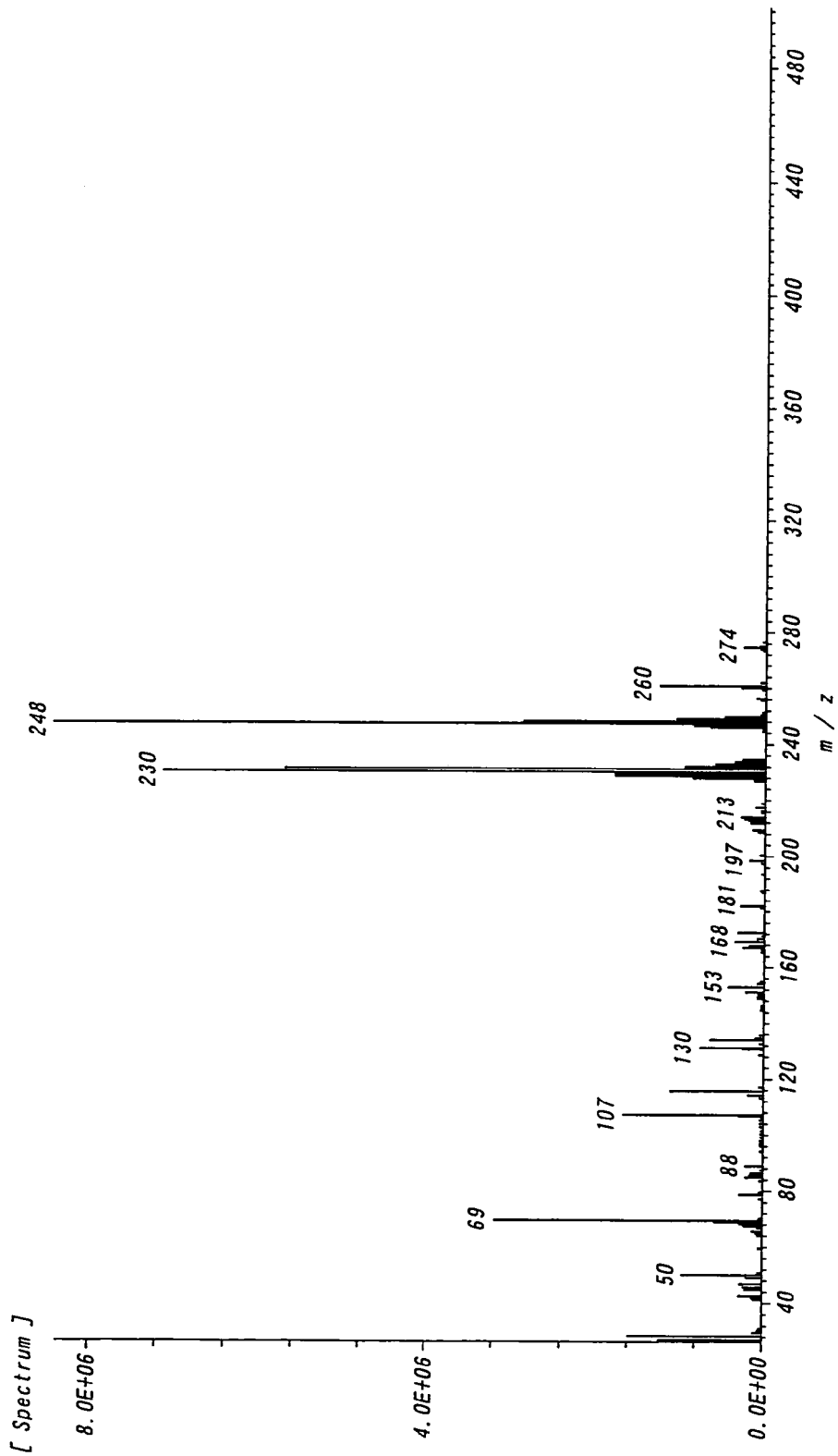
FIG. 10 is a chart showing an identification result (MS spectrum of a given component) of a molecular structure in the phosphazene derivative obtained in Example 7.

In the obtained phosphazene derivative, the identification result of GC-MS (chromatogram) is shown in FIG. 9, and MS spectrum is shown in FIG. 10.

In FIG. 9, ① shows a peak of chromatogram based on the phosphazene derivative having a structure that a ratio of ethoxy group (EO) to fluorine (F) in all Xs of the formula (3) (EO/F ratio) is 1/5. FIG. 10 shows MS spectrum of the phosphazene derivative of a component having such a peak, i.e. EO/F ratio of 1/5 (molecular weight: 274).

From FIG. 9, it is confirmed that the resulting phosphazene derivative is a phosphazene derivative in which the ratio (EO/F ratio) of ethoxy group (EO) to fluorine (F) in all Xs of the formula (3) is 1/5.

<Evaluation of Non-combustibility>

With respect to the obtained phosphazene derivative, "Evaluation of non-combustibility" is conducted in the same manner as in Example 5. The result is shown in Table 5.

Moreover, the evaluation of non-combustibility and boiling point of the phosphazene derivative synthesized in Example 7 are compared with the evaluation of non-combustibility and boiling point of $(PNF_2)_3$ and $(PN(OCH_2CH_3)_2)_3$ in Table 3.

TABLE 5

| Phosphazene derivative | Evaluation of non-combustibility | Boiling point (° C.) |
|---|---|---|
| Phosphazene derivative synthesized in Example 7 | non-combustibility | 115 |
| $(PNF_2)_3$ | non-combustibility | 51 |
| $(PN(OCH_2CH_3)_2)_3$ | fire retardant property | 427 |

—Preparation of Electrolyte—

The phosphazene derivative is mixed with an aprotic organic solvent (mixed solvent of ethylene carbonate and diethyl carbonate (ethylene carbonate/diethyl carbonate (volume ratio)=1/1)) and further added with $LiPF_6$ to obtain an electrolyte (viscosity at 25° C.=3.2 mPa·s (3.2 cP)) having a content of the phosphazene derivative of 5% by volume and a $LiPF_6$ concentration of 0.75M.

—Preparation of Cell—

A size AA lithium battery is prepared in the same manner as in Example 2 by using the above electrolyte and the measurement and evaluation of cell characteristics and the like are conducted in the same manner as in Example 2. Also, the electric conductivity (electric conduction degree) is measured. The results are shown in Table 6.

EXAMPLE 8

A phosphazene derivative is produced in the same manner as in Example 7 except that hexane (non-polar solvent) in "Synthesis of phosphazene derivative" of Example 7 is changed to tetrahydrofuran (polar solvent). The resulting phosphazene derivative has a viscosity at 25° C. of 1.4 mPa·s (1.4 cP).

Figure 11:
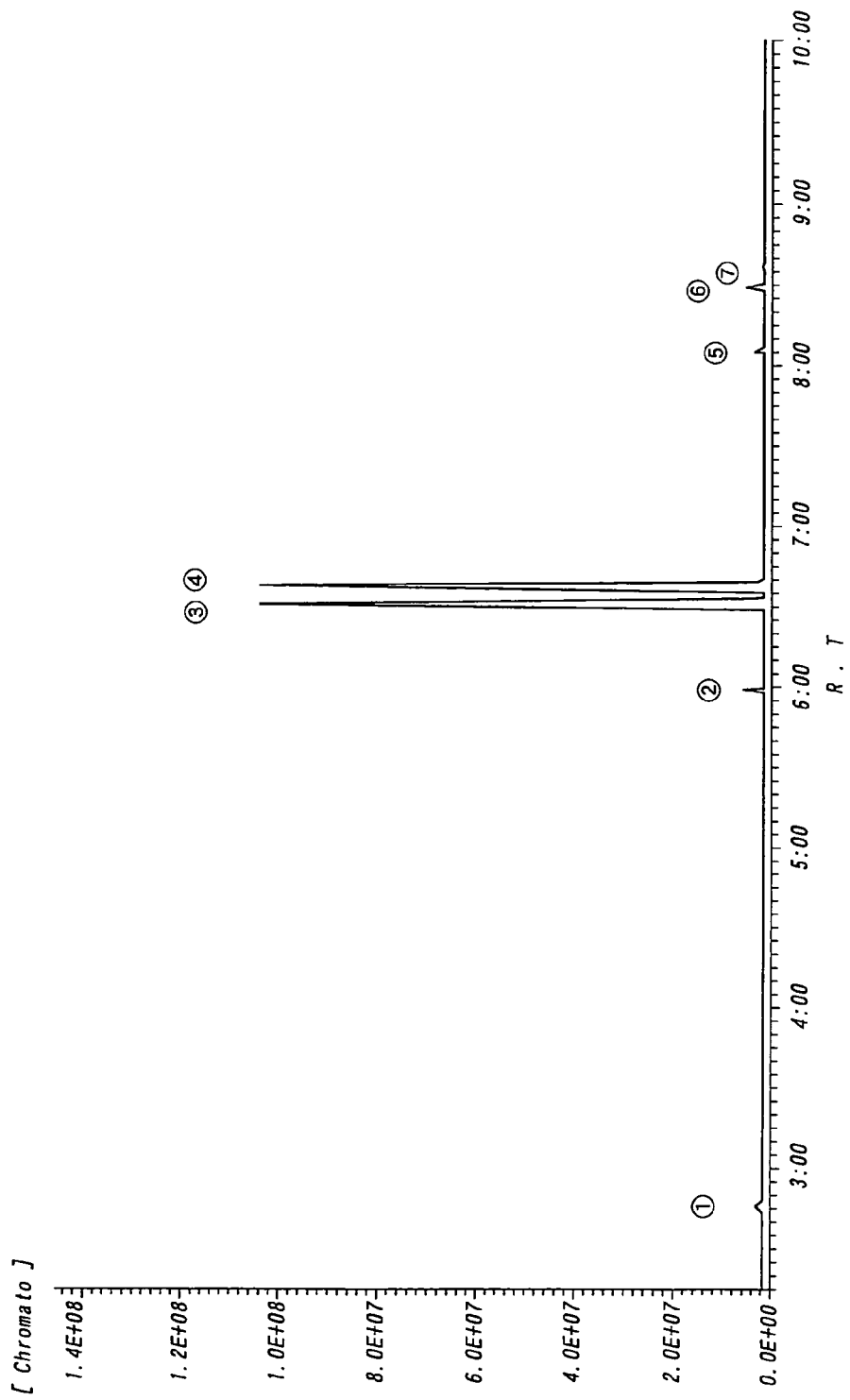
FIG. 11 is a chart showing an identification result (GC-MS chromatogram) of a molecular structure in the phosphazene derivative obtained in Example 8.
Figure 12:
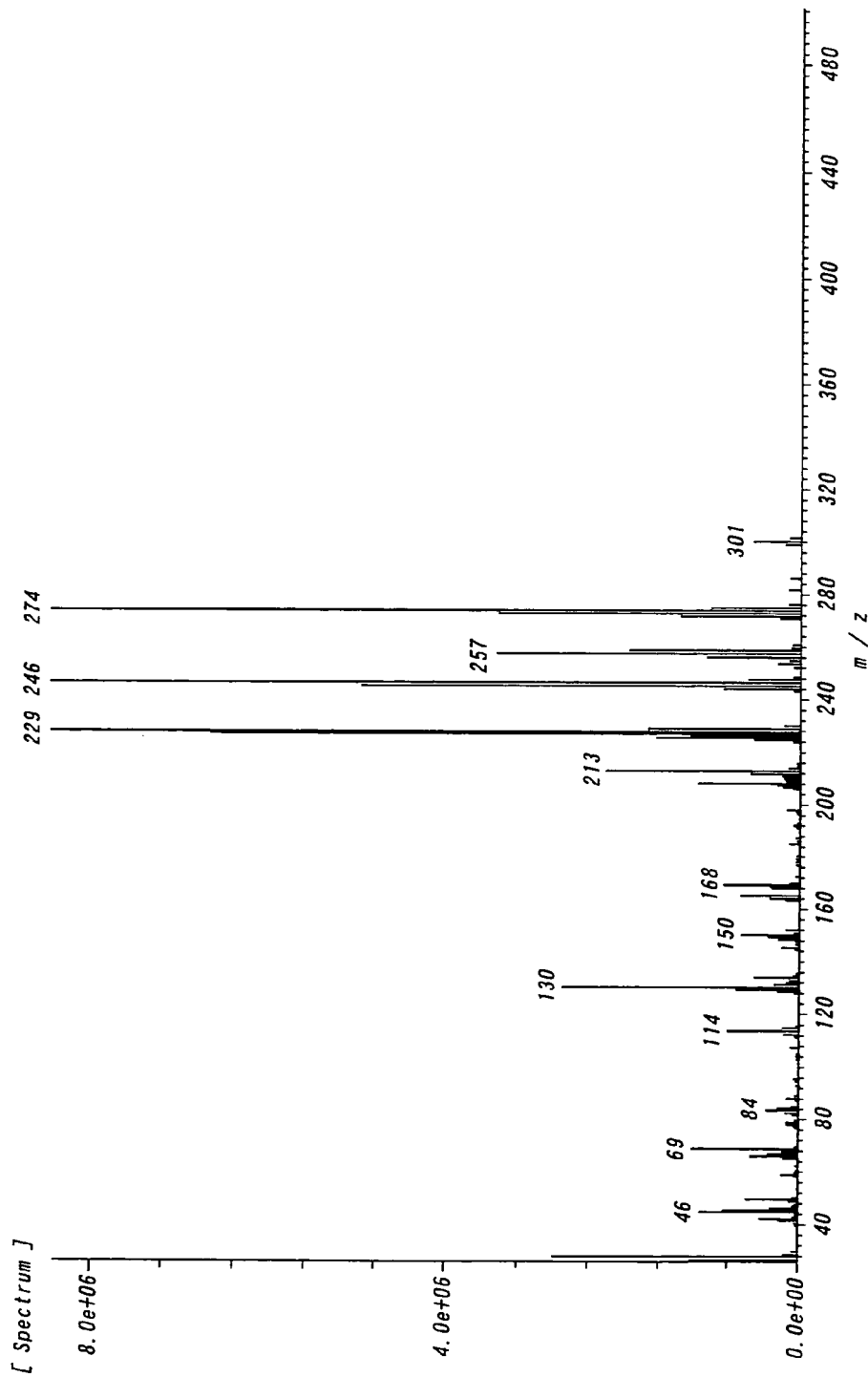
FIG. 12 is a chart showing an identification result (MS spectrum of a given component) of a molecular structure in the phosphazene derivative obtained in Example 8.
Figure 13:
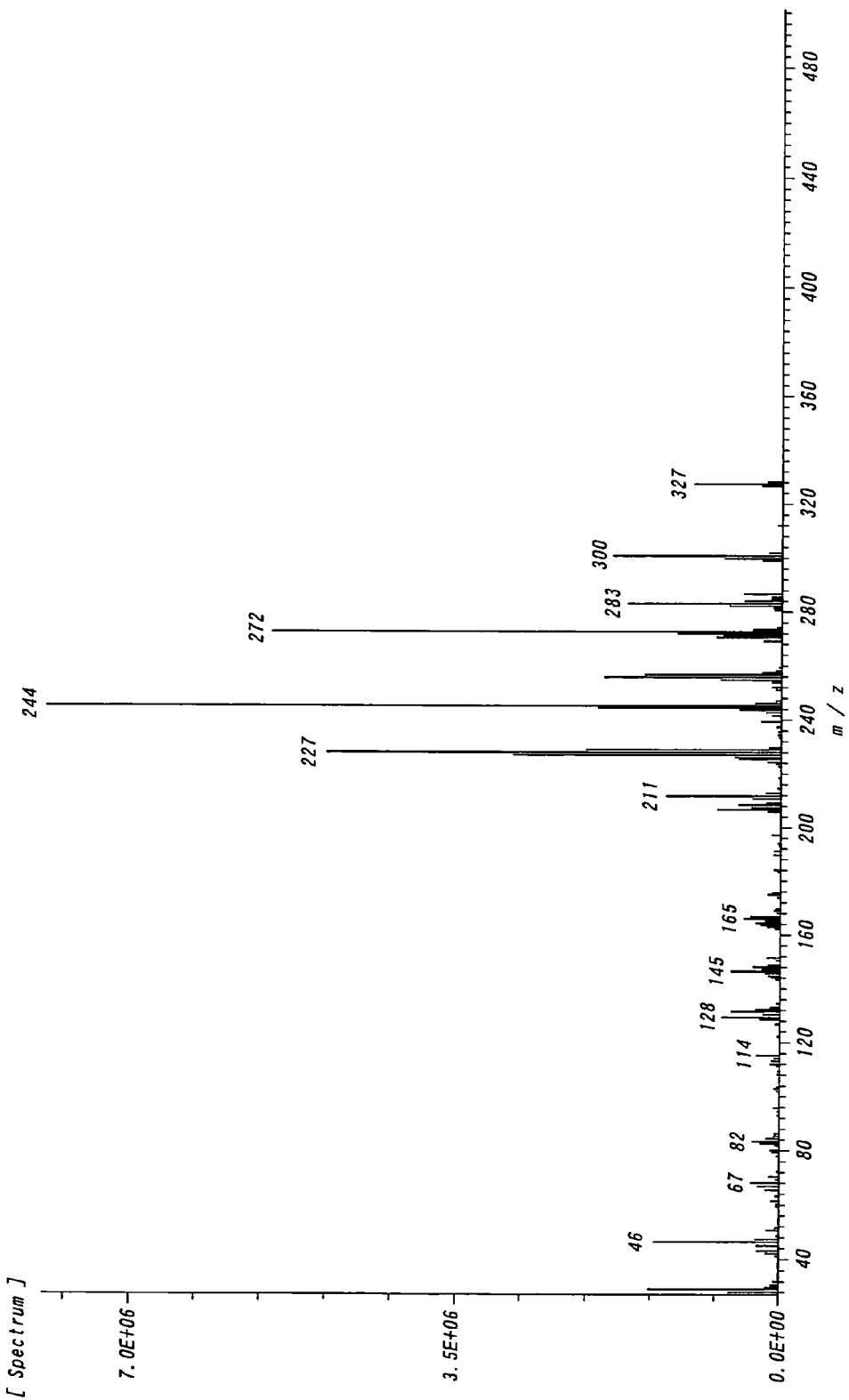
FIG. 13 is a chart showing an identification result (MS spectrum of a given component) of a molecular structure in the phosphazene derivative obtained in Example 8.

In the obtained phosphazene derivative, the identification result of GC-MS (chromatogram) is shown in FIG. 11, and MS spectrum is shown in FIGS. 12 and 13.

In FIG. 11, ① shows a peak of chromatogram based on the phosphazene derivative having a structure that a ratio of ethoxy group (EO) to fluorine (F) in all Xs of the formula (3) (EO/F ratio) is 1/5. ②, ③ and ④ show peaks based on the phosphazene derivative having a structure that a ratio of ethoxy group (EO) to fluorine (F) in all Xs of the formula (3) (EO/F ratio) is 2/4, wherein peaks of ②, ③ and ④ are phosphazene derivatives having an interrelation of position isomers (geminal, non-geminal). Peaks of ③ and ④ are phosphazene derivatives having an interrelation of steric isomers (cis-trans). ⑤, ⑥ and ⑦ show peaks based on the phosphazene derivative having a structure that a ratio of ethoxy group (EO) to fluorine (F) in all Xs of the formula (3) (EO/F ratio) is 3/3, wherein peaks of ⑤, ⑥ and ⑦ are phosphazene derivatives having an interrelation of position isomers (geminal, non-geminal). Peaks of ⑥ and ⑦ are phosphazene derivatives having an interrelation of steric isomers (cis-trans).

FIG. 12 shows MS spectrum of the phosphazene derivative having an EO/F ratio of 2/4 (molecular weight: 301), and FIG. 13 shows MS spectrum of the phosphazene derivative having an EO/F ratio of 3/3 (molecular weight: 327). Also, MS spectrum of the phosphazene derivative having an EO/F ratio of 1/5 (molecular weight: 274) is the same as in FIG. 10.

Moreover, as the structure of the isomer is confirmed by comparing chemical shifts of $^{31}$P-NMR and coupling constants in $(PNF_2)_3$, $(PN(OCH_2CH_3)_2)_3$ and the above phosphazene derivatives, there is almost a structure that one of two Xs bonded to phosphorus atom is fluorine atom and the remaining one is ethoxy group. Thus, it is judged that among three peaks having the same MS spectrum obtained by GC-MS chromatogram, smallest intensity is a peak of geminal structure having two ethoxy groups in the same phosphorus atom, and the remaining two peaks having close holding times show steric isomers of non-geminal structure (cis-trans).

From FIG. 11, it is confirmed that the resulting phosphazene derivative is a phosphazene derivative in which the ratio of ethoxy group (EO) to fluorine (F) in all Xs of the formula (3) (EO/F ratio) is 2/4. Further, it is confirmed by GC-AED that an amount of 1/5 component as EO/F ratio is 0.3% by weight, and an amount of 2/4 component is 98.5% by weight, and an amount of 3/3 component is 1.2% by weight.

Then, the evaluation of non-combustibility is conducted in the same manner as in Example 7, and an electrolyte (viscosity at 25° C.=3.5 mPa·s (3.5 cP)) is prepared and a cell is prepared, and the measurement and evaluation of cell characteristics and the like are conducted. The results are shown in Table 6.

group (EO) to fluorine (F) in all Xs of the formula (3) (EO/F ratio) is 4/2, wherein peaks of ⑤, ⑥ and ⑦ are phosphazene derivatives having an interrelation of position isomers (geminal, non-geminal), which are phosphazene derivatives having an interrelation of steric isomers (cis-trans).

Figure 15:
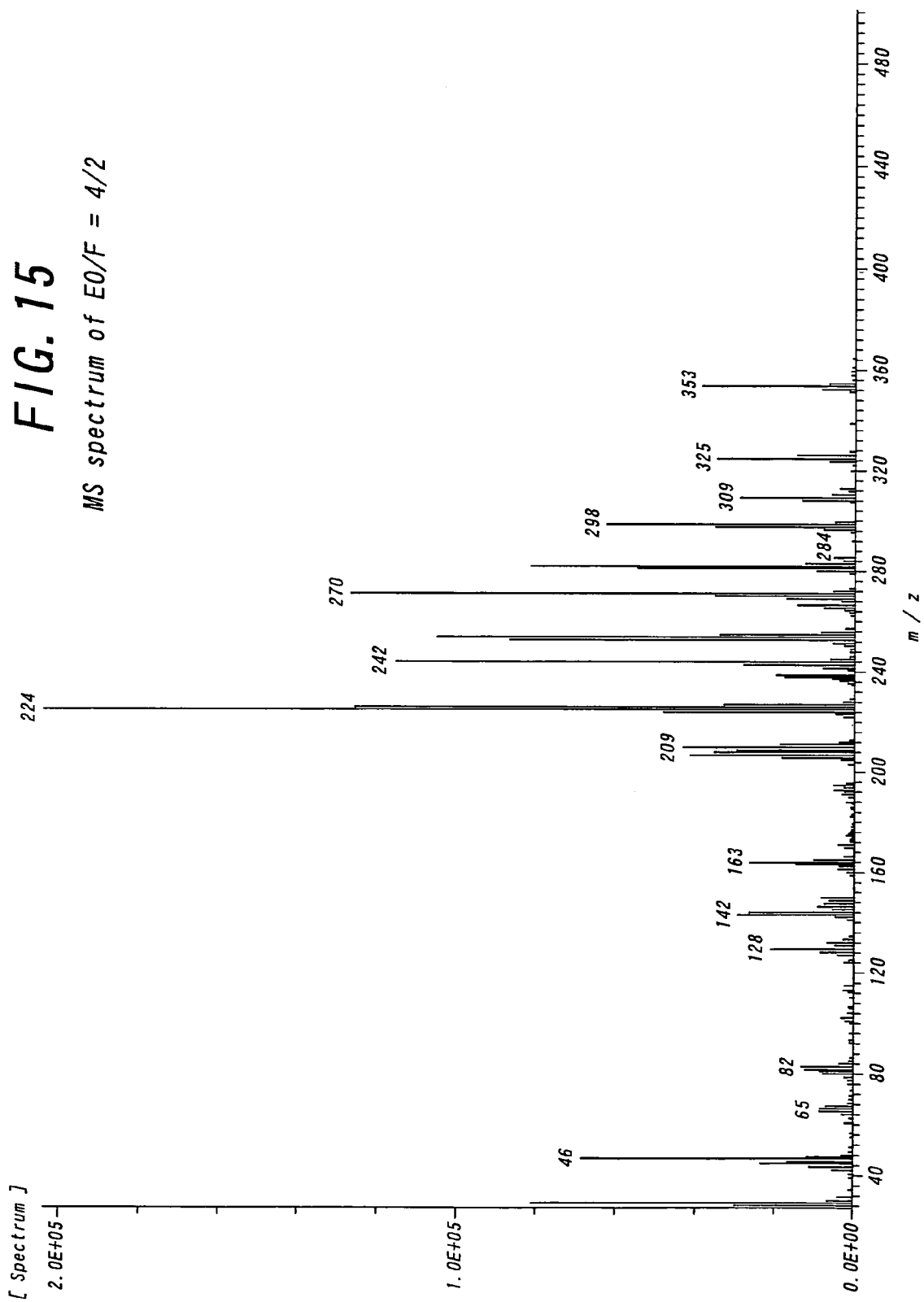
FIG. 15 is a chart showing an identification result (MS spectrum of a given component) of a molecular structure in the phosphazene derivative obtained in Example 9.

FIG. 15 shows MS spectrum of the phosphazene derivative having an EO/F ratio of 2/4 (molecular weight: 353). Also, MS spectrum of the phosphazene derivative having an EO/F ratio of 3/3 (molecular weight: 327) is the same as in FIG. 13. The structure of the isomer is confirmed by the method described in Example 8.

Figure 14:
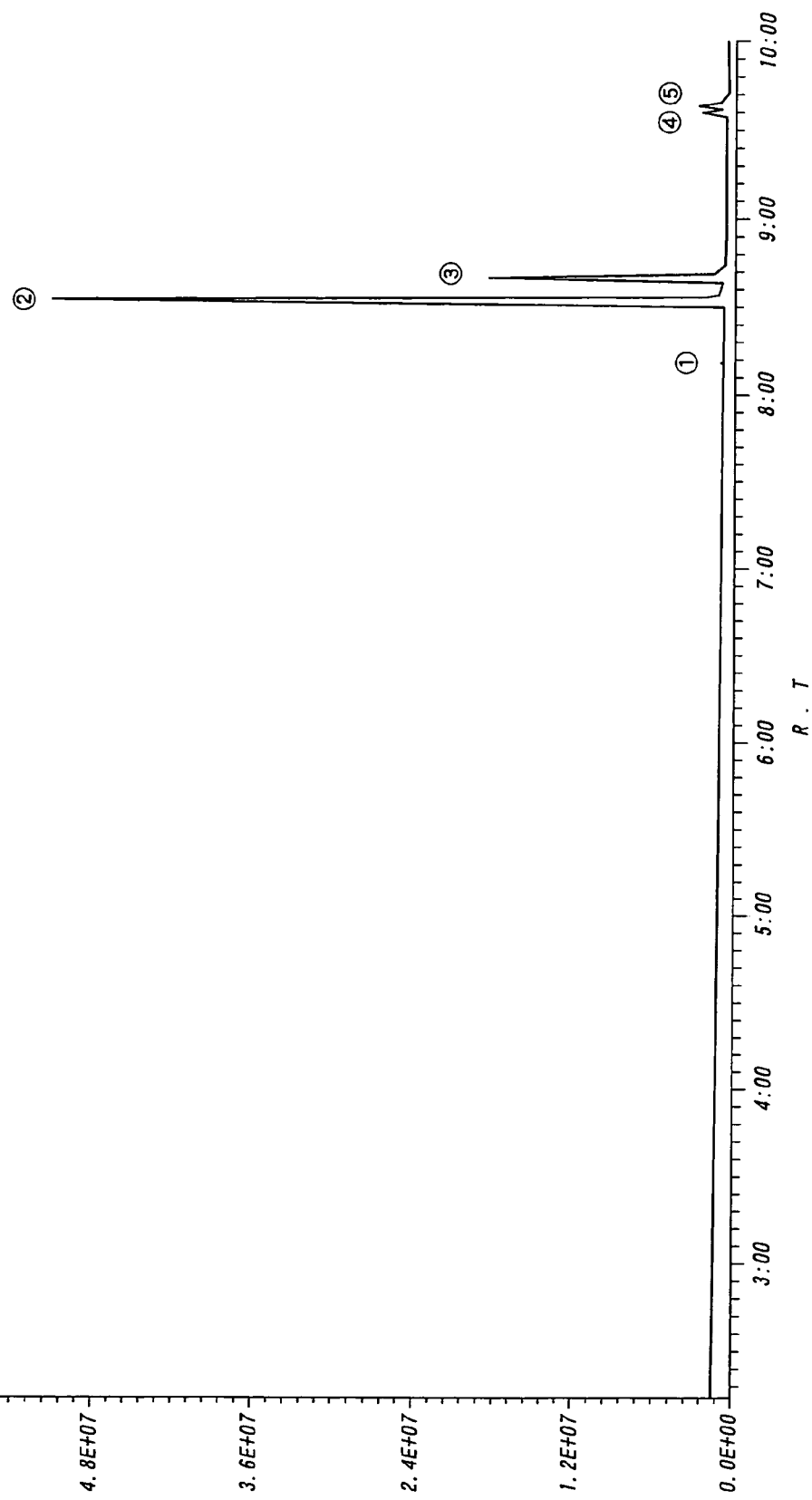
FIG. 14 is a chart showing an identification result (GC-MS chromatogram) of a molecular structure in the phosphazene derivative obtained in Example 9.

From FIG. 14, it is confirmed that the resulting phosphazene derivative is a phosphazene derivative in which the ratio of ethoxy group (EO) to fluorine (F) in all Xs of the formula (3) (EO/F ratio) is 3/3. Further, it is confirmed by GC-AED that an amount of 3/3 component as EO/F ratio is 97% by weight, and an amount of 4/2 component is 3% by weight.

Then, the evaluation of non-combustibility is conducted in the same manner as in Example 7, and an electrolyte (viscosity at 25° C.=4.0 mPa·s (4.0 cP)) is prepared and a cell is prepared, and the measurement and evaluation of cell characteristics and the like are conducted. The results are shown in Table 6.

TABLE 6

| Example | Evaluation of non-combustibility | Initial voltage (V) | Initial internal resistance (Ω) | Initial electric conductivity (mS/cm) | Discharge-recharge cycling property (reducing ratio after 50 cycles) | Low-temperature property |
|---|---|---|---|---|---|---|
| Example 7 | non-combustibility | 2.68 | 0.08 | 6.5 | 3% | 70% |
| Example 8 | non-combustibility | 2.68 | 0.09 | 6.3 | 3% | 70% |
| Example 9 | non-combustibility | 2.70 | 0.10 | 6.2 | 4% | 68% | acteristics and the like are conducted. The results are shown in Table 6.

EXAMPLE 9

A phosphazene derivative is produced in the same manner as in Example 7 except that hexane (non-polar solvent) in "Synthesis of phosphazene derivative" of Example 7 is changed to acetone (polar solvent) and sodium carbonate is changed to cesium carbonate ($Cs_2CO_3$) and the reaction is carried out under a temperature condition of 50° C. for 6 hours. The resulting phosphazene derivative has a viscosity at 25° C. of 1.8 mPa·s (1.8 cP).

In the obtained phosphazene derivative, the identification result of GC-MS (chromatogram) is shown in FIG. 14, and MS spectrum is shown in FIG. 15.

In FIG. 14, ①, ② and ③ show peaks based on the phosphazene derivative having a structure that a ratio of ethoxy group (EO) to fluorine (F) in all Xs of the formula (3) (EO/F ratio) is 3/3, wherein peaks of ①, ② and ③ are phosphazene derivatives having an interrelation of position isomers (geminal, non-geminal). Peaks of ② and ③ are phosphazene derivatives having an interrelation of steric isomers (cis-trans). ④ and ⑤ show peaks based on the phosphazene derivative having a structure that a ratio of ethoxy

INDUSTRIAL APPLICABILITY

According to the invention, there can be provided a non-aqueous electrolyte cell having high output and energy density and enabling miniaturization and weight reduction and suppressing the occurrence of dendrite and having excellent self-extinguishing property, fire retardant property, low-temperature characteristics and safety and a long service life.

Also, according to the invention, there can be provided an electrode stabilizing agent having an excellent safety for electrode, electrolyte and the like while maintaining cell characteristics as a cell by adding to the electrolyte of the cell and being stable over a long period of time and capable of providing cells having excellent self-extinguishing property and fire retardant property as well as a non-aqueous electrolyte cell using such an electrode stabilizing agent and having an excellent long-running safety.

Further, according to the invention, there can be provided a phosphazene derivative having a low viscosity, a high boiling point and an excellent safety and suitable for various applications, particularly a non-combustible material, a cell and the like as well as a production method of a phosphazene derivative in which the phosphazene derivative can be produced safely, cheaply and easily.

The invention claimed is:

1. A non-aqueous electrolyte cell comprising a positive electrode, a negative electrode capable of occluding and releasing lithium or lithium ion, and a non-aqueous electrolyte containing a support salt and a phosphazene derivative represented by the following general formula (3):

$$(PNX_2)n \qquad \text{Formula (3)}$$

wherein X is selected from a group consisting of a phenoxy group and a fluorine atom and n is 3, provided that at least one of all Xs is a fluorine atom and at least one of all Xs is a phenoxy group.

2. A non-aqueous electrolyte cell according to claim 1, wherein the phosphazene derivative has a viscosity of not more than 5 mPa·s (5 cP) at 25° C.

3. A non-aqueous electrolyte cell according to claim 1, wherein the phosphazene derivative has a boiling point of not lower than 100° C.

4. A non-aqueous electrolyte cell according to claim 1, wherein n is 3, and one of all Xs is a phenoxy group and each of the remaining five Xs are a fluorine atom.

5. A non-aqueous electrolyte cell according to claim 1, wherein n is 3, and one of two Xs bonded to two phosphorus atoms is a phenoxy group and the other is a fluorine atom and two Xs bonded to the other phosphorus atom are fluorine atoms.

6. A non-aqueous electrolyte cell according to claim 1, wherein n is 3, and one of two Xs bonded to three phosphorus atoms is a phenoxy group and the other is a fluorine atom.

* * * * *